United States Patent
Poole

(10) Patent No.: US 7,437,722 B2
(45) Date of Patent: Oct. 14, 2008

(54) DETERMINING WHICH SOFTWARE COMPONENT VERSIONS OF AN ISSUE RESOLUTION ARE INCLUDED IN A VERSION OF A SOFTWARE DEVELOPMENT PROJECT AT A PARTICULAR TIME

(75) Inventor: Damon B. Poole, Brookline, MA (US)

(73) Assignee: Accurev, Inc., Lexington, MA (US)

( * ) Notice: Subject to any disclaimer, the term of this patent is extended or adjusted under 35 U.S.C. 154(b) by 630 days.

(21) Appl. No.: 10/894,697

(22) Filed: Jul. 19, 2004

(65) Prior Publication Data
US 2006/0015850 A1    Jan. 19, 2006

(51) Int. Cl.
G06F 9/45    (2006.01)
(52) U.S. Cl. .................................................... 717/170
(58) Field of Classification Search ................. 717/170; 707/203
See application file for complete search history.

(56) References Cited
U.S. PATENT DOCUMENTS

| | | | |
|---|---|---|---|
| 4,809,170 A | | 2/1989 | Leblang et al. |
| 5,600,834 A | * | 2/1997 | Howard ....................... 707/201 |
| 5,649,200 A | | 7/1997 | Leblang et al. |
| 6,216,140 B1 | | 4/2001 | Kramer |
| 6,256,773 B1 | * | 7/2001 | Bowman-Amuah ......... 717/121 |
| 6,557,012 B1 | * | 4/2003 | Arun et al. .................. 707/203 |
| 6,978,281 B1 | | 12/2005 | Kruy et al. |
| 7,251,655 B2 | | 7/2007 | Kaler et al. |
| 7,289,973 B2 | | 10/2007 | Kiessig et al. |
| 2004/0056903 A1 | | 3/2004 | Sakai et al. |
| 2006/0031811 A1 | * | 2/2006 | Ernst et al. .................. 717/100 |

\* cited by examiner

*Primary Examiner*—John Chavis
(74) *Attorney, Agent, or Firm*—Wolf, Greenfield & Sacks, P.C.

(57) ABSTRACT

Systems and methods for automatically determining, for a version of a software developing project, which software component versions defined for an issue resolution at a particular time, for example, a time in the past, are included in the project version at the particular time. Such determination may include determining the software component versions included in an issue resolution at a particular time, and, for each determined version, determining whether the version is included in the project version. The software components that should be propagated to other versions of a software development project so that these versions have a complete issue resolution may be determined. Further, differences between software project versions, from an issue resolution prospective, may be determined.

25 Claims, 23 Drawing Sheets

| Issue Num. | EID | TX # | Stream ID | Edition | Member |
|---|---|---|---|---|---|
| 1 | 2 | 20 | 5 | 1 | 1 |
| 1 | 3 | 20 | 5 | 1 | 1 |
| 1 | 2 | 21 | 5 | 3 | 1 |
| 1 | 3 | 22 | 5 | 1 | 0 |

FIG. 8

| Stream ID | EID | TX # | In-Progress? |
|---|---|---|---|
| 4 | 2 | 6 | 1 |
| 4 | 2 | 7 | 0 |
| 2 | 2 | 7 | 1 |
| 2 | 2 | 8 | 0 |
| 1 | 2 | 8 | 1 |
| 5 | 2 | 9 | 1 |
| 4 | 2 | 10 | 1 |
| 4 | 2 | 11 | 1 |
| 5 | 2 | 12 | 1 |
| 5 | 2 | 13 | 1 |

FIG. 9

| EID | Stream ID | Instance ID | Real Stream ID | Edition ID | TX # |
|---|---|---|---|---|---|
| 2 | 4 | 1 | 4 | 1 | 6 |
| 2 | 2 | 1 | 4 | 1 | 7 |
| 2 | 1 | 1 | 4 | 1 | 8 |
| 2 | 5 | 1 | 5 | 1 | 9 |
| 2 | 4 | 2 | 4 | 2 | 10 |
| 2 | 4 | 3 | 4 | 3 | 11 |
| 2 | 5 | 2 | 4 | 3 | 12 |
| 2 | 5 | 3 | 5 | 3 | 13 |

FIG. 10

| | EID | Parent Stream | Parent Edition | Child Stream | Child Edition |
|---|---|---|---|---|---|
| 1112 | 2 | 4 | 1 | 5 | 1 |
| 1114 | 2 | 4 | 1 | 4 | 2 |
| 1116 | 2 | 4 | 2 | 4 | 3 |
| 1118 | 2 | 4 | 3 | 5 | 3 |

FIG. 11

| Stream ID | Name | Parent Stream ID | TX # |
|---|---|---|---|
| 1 | Acme | 0 | 1 |
| 2 | Fixes | 1 | 2 |
| 3 | Interface | 1 | 3 |
| 4 | fixes_fred | 2 | 4 |
| 5 | interface_george | 3 | 5 |

FIG. 12

DETERMINING WHICH SOFTWARE COMPONENT VERSIONS OF AN ISSUE RESOLUTION ARE INCLUDED IN A VERSION OF A SOFTWARE DEVELOPMENT PROJECT AT A PARTICULAR TIME

RELATED APPLICATIONS

Commonly-owned U.S. patent application titled SYSTEMS AND METHODS FOR DETERMINING THE SOFTWARE COMPONENTS INCLUDED IN A VIEW OF A SOFTWARE DEVELOPMENT PROJECT AT A PARTICULAR TIME by Damon B. Poole, filed on even date herewith under Ser. No. 10/894,964 (hereinafter, the Poole application) is hereby incorporated by reference in its entirety.

BACKGROUND

Developing software applications and products often requires the coordinated efforts of many developers (e.g., software programmers). This coordinated effort is referred to herein as a "software development effort" or "development effort," and the body of work (e.g., one or more software applications and/or products) being developed by the effort is referred to as a "software development project," "development project" or "project." At any given time, as part of a software development effort, multiple developers may be working on different components of a software development project and/or different versions of these components (e.g., for different users or situations). Managing the concurrent development of these different software components and versions is commonly referred to as configuration management (CM). CM software applications (i.e., programs) assist developers and project managers in the management of a software development project, including maintaining coherency between different components and versions.

A software development effort typically involves adding or improving functionality (i.e., adding features) to a product, and fixing functionality that is not working properly (i.e., fixing defects or "bugs"). Typically, one or more fixes, features or combinations thereof (i.e., development items) are grouped together as a development unit called an "issue." At a minimum, an issue defines one or more development items, and often includes other information. Issues are often tracked as part of a development effort, and tracking information may be added to an issue description, including information indicating that the issue has been resolved. Because of the often significant numbers of issues involved in a development effort, development efforts typically employ an issue tracking system to track the progress of the resolution of each issue.

A primitive issue tracking system may involve the creation of a list of issues on paper, where a description of each issue is written down. Notes may be taken throughout the progress of resolving the issue, and the issue may be checked off when it has been resolved. More often, tracking systems are implemented using a computer system, for example, as part of a CM application. Such computerized tracking systems may provide a unique identifier (e.g., a serial number) for each issue, and provide data fields that enable a user (e.g., a developer, supervisor or project team leader) to track the progress of the issue's resolution.

During the resolution of an issue, the one or more software components (e.g., objects, records, programs, files, directories, etc.) that need to be modified or added to resolve the issue is/are determined. Some issue tracking systems enable an association to be created and maintained between an issue and the one or more software components needed to resolve the issue. More specifically, an association can be created and maintained between an issue and the versions of the one or more software components needed to resolve the issue. As used herein, an "issue resolution" or "resolution" is an abstraction (e.g., a software abstraction such as an object, record, variable or table) defining an association between a an issue and one or more software components and versions thereof that provide a solution to the issue. For example, an issue is created describing a bug, and it is determined that a first version of a file is causing the bug. A second version of the file that resolves the problem is developed, and an issue resolution created that associates the second version of the file with the resolution of the issue.

As described above, a software development effort often involves multiple developers working concurrently on different versions of different software components. Some CM applications provide each developer a "workspace" (defined below) in which the developer can add, modify and delete components of the development project pertinent to the developer's objective. Further, a CM application may maintain one or more versions of the project itself (e.g., branches or streams—defined below), and a developer's workspace may be configured to enable the developer to make changes to a particular version of the project. As used herein, a "version" of a software development project (or other software entity) is a set of software components of the project, and for each software component, a version thereof. It should be appreciated that different versions of a software project (or other type of software entity) may have the same content (e.g., may include a same set of software component versions) or different content. A developer's workspace may be considered a version of the project. It is often desirable to propagate modifications made in a developer's workspace (e.g., an addition, change or deletion of one or more software objects) to other versions of the project, including other workspaces. CM applications often are configured to provide such propagation.

In addition to providing the propagation of modified software components, some CM applications provide an issue tracking system that enables a user to record that an issue resolution has been propagated to one or more versions of the project. For example, the user can make an entry in the tracking system that indicates that a particular issue resolution has been propagated to a particular version of the project. To determine that an issue resolution has been propagated to a version of the project, the user determines the software components and versions associated with the issue resolution, for example, by looking up the issue resolution in the issue tracking system. Then the user determines whether all of the versions of the software components have been propagated to the version of the project, for example, by looking up the list of software components and their associated versions currently in the project.

Thus, known issue tracking systems require a user to manual determine whether an issue resolution has been propagated to particular version of a project, for example, by looking up information on the system. Further, the user must manually record the propagation of the issue resolution. Such manual determination is time-consuming and susceptible to human error.

Some known issue tracking systems allow the definition of an issue resolution to be altered after the versions of the software components defined by the issue resolution have been propagated to one or more versions of a project. Consider the following example. An issue resolution specifies a second version of a file, which resides in a first branch of a project. The second version of the file is then propagated to a second branch of the project, and a user creates a record indicating that the issue resolution is included in (i.e., has been propagated to) the second branch. Then, after the issue resolution has been propagated, the developer realizes that there is another change that needs to be made to the file. The developer then creates a third version of the file in the first branch and alters the definition of the issue resolution to include the third version of the file, replacing the second version. Another example is if the developer adds another file to the issue resolution.

If the record is not updated to reflect that the issue resolution (in its current form) has not been propagated to the branch, then the propagation record is now inaccurate, as the second branch does not actually include the issue resolution. Rather, the second branch includes the earlier second version of the file. Known systems do not have the ability to automatically detect this scenario and update the record, such that user must manually do so.

Thus, known issue tracking systems are susceptible to human error resulting in the maintenance of an inaccurate record of issue propagation. As a result, a customer may be provided a version of a software product that allegedly includes a resolution to an issue (e.g., a bug fix or a new feature), but, in fact, does not include the resolution.

Another shortcoming of known issue tracking systems is that no electronic record is maintained of the history of changes made to an issue resolution (i.e., changes to the set of software component versions included therein). Thus, known systems are limited to maintaining only the current state of an issue resolution, such that the state of an issue resolution (e.g., the software components included therein) at a time in the past cannot be determined automatically.

SUMMARY

In an embodiment of the invention, a method is provided for a software development project represented by a hierarchy of versions of the software development project, each version including a set of versions of software components. It is determined determining whether the one or more software component versions included in an issue resolution at a first time are also included in a first version of the software development project at the first time. The issue resolution represents a change to the software development project. The one or more software component versions included in the issue resolution at a first time are determined by accessing a data structure representing a history of changes to the issue resolution. For each determined software component, it is determined whether the software component version was included in the first version at the first time.

In another embodiment of the invention, a computer-readable medium is provided that stores computer-readable signals defining instructions that, as a result of being executed by a computer, instruct the computer to perform the method described in the preceding paragraph.

In another embodiment, a system is provided for a software development project represented by a hierarchy of versions of the software project, each version including a set of versions of software components. The system determines whether one or more software component versions included in an issue resolution at a first time are included in a first version of the software development project at the first time, the issue resolution representing a change to the software development project. The system includes an issue resolution components generator to receive one or more inputs specifying an issue resolution and a value corresponding to a first time. The issue resolution components generator determines the one or more software components versions included in the issue resolution at the first time by accessing a data structure representing a history of changes to the issue resolution, and outputs the one determined software component versions. The system also includes a version checking module to receive one or more inputs specifying the one or more determined software component versions and a value corresponding to the first time. The version checking module determines, for each of the one or more determined software component versions, whether the determined version was included in the first project version at the first time.

In yet another embodiment, a system is provided for a software development project represented by a hierarchy of versions of the software project, each version including a set of versions of software components. The system determines whether one or more software component versions included in an issue resolution at a first time are included in a first version of the software development project at the first time, the issue resolution representing a change to the software development project. The system includes means for determining the one or more software component versions included in the issue resolution at a first time by accessing a data structure representing a history of changes to the issue resolution The system also includes a version checking module to receive one or more inputs specifying the one or more determined software component versions and a value corresponding to the first time. The version checking module determines, for each of the one or more determined software component versions, whether the determined version was included in the first project version at the first time.

In another embodiment, provided is a computer-readable medium having stored thereon a plurality of computer-readable signals. The signals define a data structure for use in conjunction with a configuration management software application for managing a software development project including a plurality of software components. The data structure represents a history of changes to an issue resolution, the issue resolution including one or more software components representing a change to the software development project. The data structure includes a plurality of entries. Each entry includes one or more values corresponding to a particular time, one or more values indicating a version of a software component and one or more values indicating whether the version of the software component was included in the issue resolution at the particular time.

In another embodiment, a method is provided for a software development project represented by a hierarchy of versions of the software project, each version including a set of versions of software components. The contents of an issue resolution representing a change to the software development project are modified. At a first time, one or more inputs specifying whether to include a first software component version in a first issue resolution are received. An entry is recorded in a data structure representing a history of changes to at least the first issue resolution. The entry includes one or more values corresponding to the first time, and one or more values specifying whether to include the first software component in the first issue resolution at the first time.

In another embodiment of the invention, a computer-readable medium is provided that stores computer-readable signals defining instructions that, as a result of being executed by a computer, instruct the computer to perform the method described in the preceding paragraph.

In yet another embodiment, a system is provided for a software development project represented by a hierarchy of versions of the software project, each version including a set of versions of software components. The system modifies the contents of an issue resolution representing a change to the software development project. The system includes a user interface to receive, at a first time, one or more inputs specifying whether to include a first software component version in a first issue resolution. The system also includes an issue resolution engine to record an entry in a data structure representing a history of changes to at least the first issue resolution. The entry includes one or more values corresponding to the first time, and one or more values specifying whether to include the first software component in the first issue resolution at the first time.

In another embodiment, a system is provided for a software development project represented by a hierarchy of versions of the software project, each version including a set of versions of software components. The system modifies the contents of an issue resolution representing a change to the software development project. The system includes a user interface to receive, at a first time, one or more inputs specifying whether to include a first software component version in a first issue resolution. The system also includes means for recording an entry in a data structure representing a history of changes to at least the first issue resolution. The entry including one or more values corresponding to the first time, and one or more values specifying whether to include the first software component in the first issue resolution at the first time.

Other advantages, novel features, and objects of the invention, and aspects and embodiments thereof, will become apparent from the following detailed description of the invention, including aspects and embodiments thereof, when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment or aspect of the invention shown where illustration is not necessary to allow those of ordinary skill in the art to understand the invention.

BRIEF DESCRIPTION OF THE DRAWINGS

FIG. 8 is a block diagram illustrating an example of a historical issue resolution data structure;

FIG. 9 is a block diagram illustrating an example of a historical stream in-progress data structure;

FIG. 10 is a block diagram illustrating an example of a historical virtual version mapping data structure;

FIG. 11 is a block diagram illustrating an example of a version ancestry data structure;

FIG. 12 is a block diagram illustrating an example of a historical stream ancestry chain data structure;

DEFINITIONS

The following terms have the following meanings in this application. All definitions, as defined and used herein, should be understood to control over dictionary definitions, definitions in documents incorporated by reference, and/or ordinary meanings of the defined terms.

As used herein, a "plurality" means two or more.

As used herein, a "software component" is a component of a larger software entity, for example, an application (program), a development project, a product, another software component, another type of software entity or any combination thereof. A software component may be, for example, a program, a file, a directory, a directory element, an object, a record, a table, another type of software component or any combination thereof. As used herein, a "directory element" is a directory or a file.

Figure 2:
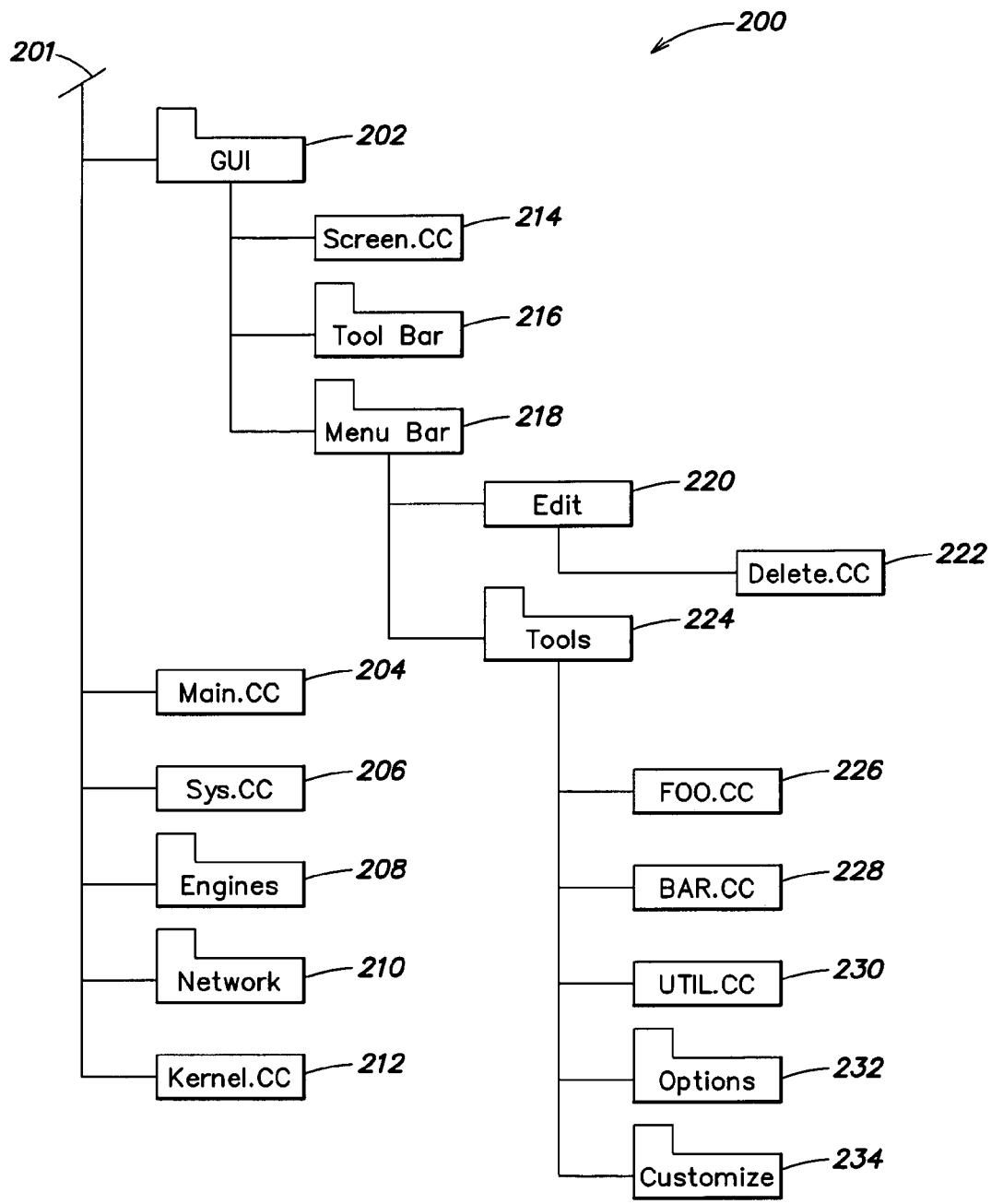
FIG. 2 is a diagram illustrating an example of a directory hierarchy.

As used herein, a "file hierarchy" is a logical hierarchy defining an organization of files. FIG. 2, described in more detail below, illustrates an example of a directory hierarchy. A file hierarchy includes at least a "root directory" at a highest level of the hierarchy. The root directory may include, at a second level in the hierarchy, one or more directory elements. As used herein, a "directory element" is an element of a directory, and may be any of a variety of types of software components (e.g., a file or directory). As used herein, a "directory," including the root directory and any of its sub-directories, is a directory element (e.g., of a file hierarchy) that includes one or more other directory elements, e.g., files and/or directories. As used herein, a "child element" or "child" of a directory (e.g., the root directory or any of its sub-directories) is an element included within the directory at a level immediately below the level of the hierarchy, whereas any element included within the directory, regardless of level, is referred to as a "descendant element" or "descendant" of the directory. Conversely, a directory is referred to herein as a "parent directory" or "parent" of any elements included in the directory at the level immediately below the directory, and is referred to as an "ancestor element" or "ancestor" of any included element, regardless of hierarchy level. Conceptually, a file hierarchy is not limited to a maximum number of levels, although in practice, this number may be limited by computational and storage capabilities of the system on which the file hierarchy is implemented.

As used herein, a "stream" is a software abstraction representing a version of a software development project (or other type of software entity) and including a set of software components. As used herein, a "set" of items may include one or more of such items. For example, a set of software components may include one or more software components.

Figure 3:
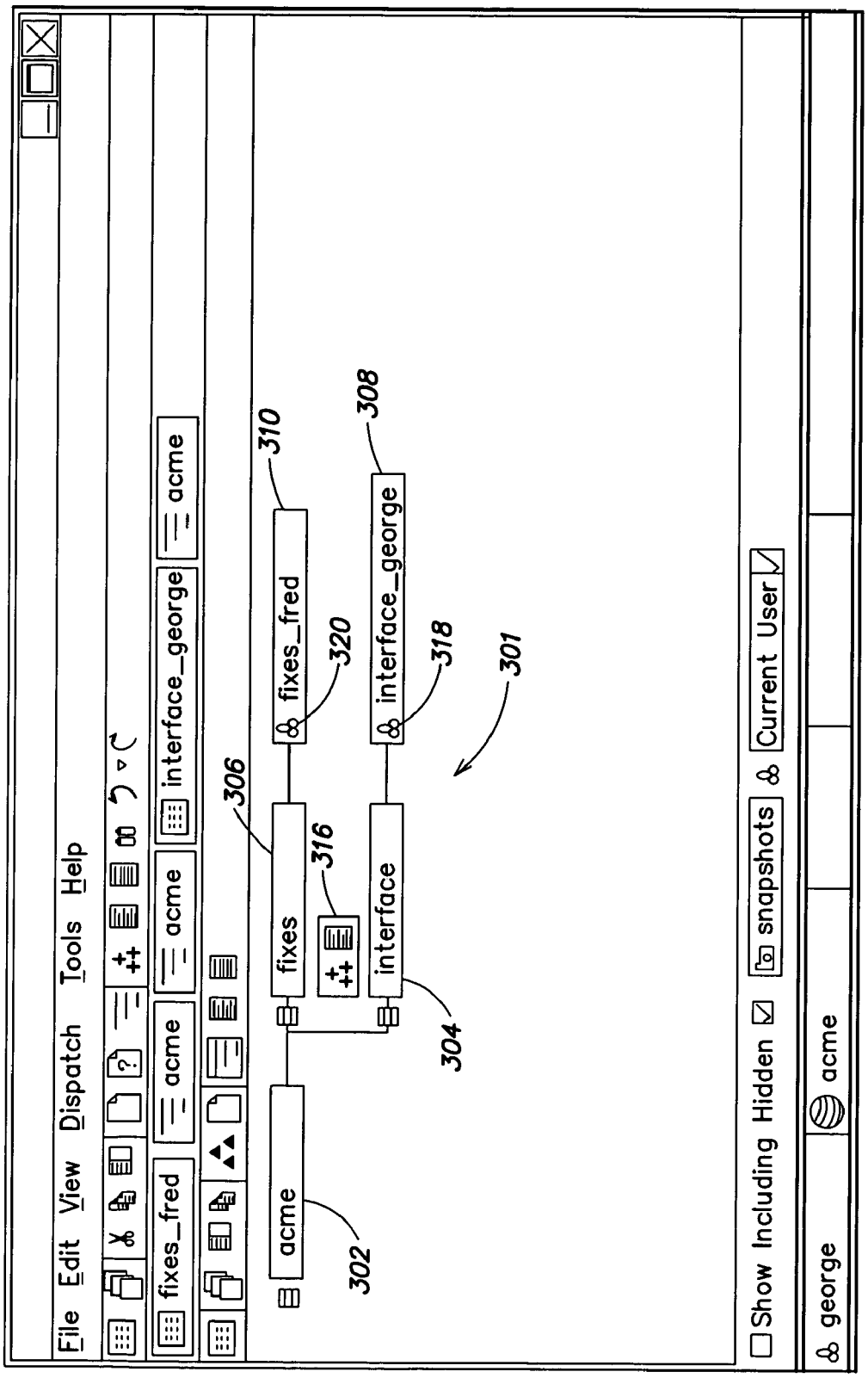
FIG. 3 is a screen shot illustrating an example of a GUI display that includes a representation of a stream hierarchy.

As will be described in more detail below, a stream may be part of a stream hierarchy. As used herein, a "stream hierarchy" is a logical hierarchy of streams defining relationships between streams. FIG. 3, described in more detail below, illustrates an example of a stream hierarchy. A stream hierarchy includes at least one stream, the "source stream", which is at a highest level of the hierarchy, and is the stream from which the other streams of the hierarchy are ultimately derived. A stream having one or more children is a "parent stream" or "parent" of each child stream. A parent stream, including the source stream, may have one or more "children" or "child streams," that each inherit one or more properties of the parent stream and its ancestors. For example, as will be described in more detail below, a child stream may be configured to inherit one or more software components and properties thereof from its parent. As will be explained in more detail below, although a child stream typically is derived directly (i.e., created from) its parent stream, this is not always the case, as a stream's relative position within the hierarchy may change over time. As a result, a child stream may have a parent from which the child was not derived.

As used herein, a "workspace" is a type of stream in which a user (e.g., a developer) can make changes to the content of a software entity (e.g., a software development project). Workspaces may be limited to being at the bottom of a stream hierarchy and any stream ancestry chains (described below) determined for the stream hierarchy. In some embodiments, workspaces are configured such that they cannot have child streams; i.e., so that they cannot be a parent stream. Thus, in some embodiments, as will be described in more detail below, changes to a software entity are made only in workspaces, and then propagated to other streams.

As used herein, a "user interface" is an application or part of an application (i.e., a set of computer-readable instructions) that enables a user to interface with an application during execution of the application. A user interface may include code defining how an application outputs information to a user during execution of the application, for example, visually through a computer screen or other means, audibly through a speaker of other means, and manually through a game controller or other means. Such user interface also may include code defining how a user may input information during execution of the application, for example, audibly using a microphone or manually using a keyboard, mouse, game controller, track ball, touch screen or other means.

As used herein, a "visual user interface" is the portion of the user interface that defines how information is visually presented (i.e., displayed) to the user, and defines how the user can navigate the visual presentation (i.e., display) of information and input information in the context of the visual presentation. During execution of the application, the visual interface controls the visual presentation of information and enables the user to navigate the visual presentation and enter information in the context of the visual presentation. Types of visual user interfaces range from command-driven interfaces, where users type commands, menu-driven interfaces, where users select information from menus, and combinations thereof, to GUIs, which typically take more advantage of a computer's graphics capabilities, are more flexible, intuitive and easy to navigate and have a more appealing "look-and-feel" than command-driven and menu-driven visual user interfaces.

As used herein, the visual presentation of information presented by a user interface, visual user interface or GUI is referred to as a "user interface display", "visual user interface display" or a "GUI display", respectively.

As used herein, an "application programming interface" or "API" is a set of one or more computer-readable instructions that provide access to one or more other sets of computer-readable instructions that define functions, so that such functions can be configured to be executed on a computer in conjunction with an application program. An API may be considered the "glue" between application programs and a particular computer environment or platform (e.g., any of those discussed below) and may enable a programmer to program applications to run on one or more particular computer platforms or in one or more particular computer environments.

As used herein, a "data structure" is an ordered arrangement of data defined by computer-readable signals recorded by a program for use by that or another program(s). These signals may be read by a computer system, stored on a medium associated with a computer system (e.g., in a memory, on a disk, etc.) and may be transmitted to one or more other computer systems over one or more communications media such as, for example, one or more segments of a network.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

When separating items in a list, "and/or" shall be interpreted as being inclusive, i.e., the inclusion of at least one, and potentially including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of", when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, shall be closed or semi-closed transitional phrases, as set forth, with respect to claims, in the United States Patent Office Manual of Patent Examining Procedures (Original Eighth Edition, August 2001), Section 2111.03.

DETAILED DESCRIPTION

Described herein are systems and methods for automatically determining for a stream (or other type of version of a project, e.g., a branch), which software component versions defined for an issue resolution at a particular time (e.g., a current time or a time in the past) are included in the stream. Such determination may include determining the software component versions included in an issue resolution at a particular time, and, for each determined version, determining whether the version is included in the stream.

In some embodiments, the definition of an issue resolution is changed over time, even after the issue resolution has been propagated to a stream. In such embodiments, the above determinations still may be made accurately for the stream.

From the above determinations, software component versions that should be propagated to a stream so that the stream has a complete issue resolution may be determined. Further, differences between streams (e.g., from an issue resolution perspective) may be determined.

Any of the following data structures and combinations thereof may be provided in embodiments of the invention to assist in the aforementioned determinations: one or more data structures representing a history of changes to an issue resolution (e.g., the component versions defined therefor); one or more data structures that represent a history of changes to the component versions included in streams; and one or more data structures (e.g., historical and non-historical) that represents relationships between versions of software components.

Some embodiments described below do not require the recording (e.g., at the explicit instruction of a user) of the fact that an issue resolution as a whole or in part (i.e., less than all of the component versions thereof) was included or not included in a particular stream at a particular time. Rather, in such embodiments, a determination may be made "on the fly" (i.e., dynamically), for example, by accessing one or more of the aforementioned data structures, as is described below in more detail.

A user interface may be provided that enables a user (e.g., a developer, project leader, team leader, etc.) to enter an issue, and to assign one or more software components and versions thereof to a resolution of the issue. The user interface may enable a user to dynamically configure an issue tracking system (e.g., dynamically configure the issue tracking system after it has been deployed on a customer site).

Although several embodiments discussed herein are described primarily in reference to files, it should be appreciated that the invention is not limited thereto. Embodiments of the invention may be applied to or implemented using any of a variety of types of software components such as, for example, any of those described above. Further, although several embodiments described herein are described primarily in reference to a software development project, it should be appreciated that the invention is not limited thereto. Embodiments of the invention may be applied to or implemented using any of a variety of types of software entities such as, for example, any of those described above.

Further, although some embodiments discussed herein are discussed primarily in relation to streams, the invention is not so limited. The methods and systems described herein may be applied to any type of version of a software development project or other entity.

In some embodiments of the invention, every transaction affecting a software entity (e.g., a software development project) is recorded, for example, in a database. A transactions may include: a creation, modification or deletion of any of a software entity, a software component or a stream; a promotion of a software component from one stream to another, an updating of a stream; a change of location of a stream within a stream hierarchy; a change of location of a software component within a file hierarchy; the creation, modification or deletion of an issue and/or an issue resolution; the creation, modification or deletion of any information (e.g., meta data) relating to any of the foregoing; any other type of transaction; and any combination of the foregoing.

Each transaction may be assigned a unique transaction identifier, for example a number. Such an identifier may be referred to herein as a "transaction number." A time (e.g., a standard time) at which the transaction occurred may be associated with each transaction, such that each transaction corresponds to a time. The association of a transaction and a time may be stored as an entry in a data structure. Such a data structure may be referred to herein as "transaction data structure," and may include a plurality of entries, each entry representing a transaction and including a transaction number, a time and possibly other information (e.g., a description of the transaction).

Each transaction may result in a new entry being created in one or more other data structures as well, for example, any of data structures 800-1200. described below in more detail. Each new entry may include the transaction number associated with the transaction. The transaction data structure and the other data structures together may form a historical project development database, from which the state of various properties (e.g., content and other parameters) of a development project at any time during the life of the project may be determined and recreated. Specific examples of this ability to determine and recreate a past state of one or more parameters of a project is discussed in more detail below.

The function and advantage of these and other embodiments of the present invention will be more fully understood from the examples described below. The following examples are intended to facilitate an understanding of the invention and to illustrate the benefits of the present invention, but do not exemplify the full scope of the invention.

EXAMPLES

Figure 1:
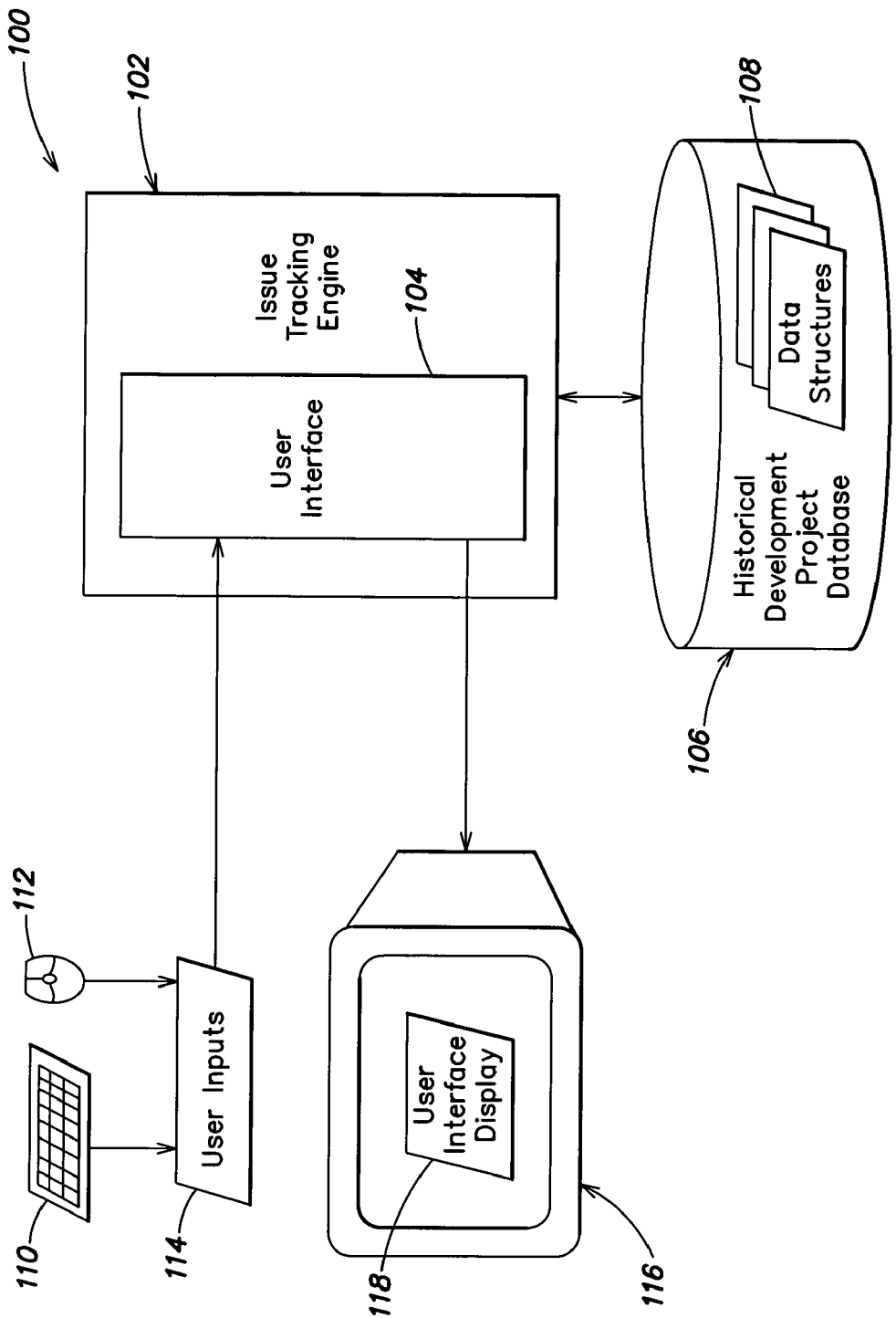
FIG. 1 is a block diagram illustrating an example of a system for modifying an issue resolution and/or determining the software components of an issue resolution that are included in a stream at a particular time.

FIG. 1 is a block diagram illustrating an example of a system 100 for associating/disassociating software component versions (also referred to herein as "component versions") with an issue resolution and for determining which component versions of an issue resolution are included within a stream at a particular time. System 100 may include any of issue tracking engines 102 and a historical development project database 106, which may include one or more data structures 108. The issue tracking engine 102 may be configured to receive one or more user inputs 114, for example, user inputs specifying one or more of any of the following; streams, software components, versions of software components, issues, issue resolutions, transaction numbers, time, other inputs, and any combination of the foregoing. These inputs may be received from any of plurality of types of user input devices, for example, keyboard 110, mouse 112, a touch screen, a trackball, a microphone, or any other type of input device.

The issue tracking engine 102 may be configured to create one or more issue resolutions, to associate/disassociate software component versions with issue resolutions based on the user inputs 114, and to store information relating thereto in one or more of the data structures 108 of database 106, for example, as described in more detail below. As used herein, associating a software component version with an issue resolution is the same as adding a software component version to an issue resolution. Similarly, disassociating a software component version from an issue resolution is the same as removing a software component version from an issue resolution.

Each modification (e.g., addition, change, deletion) to an issue resolution may be stored along with a transaction number so that a history of changes to issue resolutions may be maintained.

Engine 102 may be configured to access one or more of the data structures 108, based on user inputs 114, to determine the software component versions included in an issue resolution at a particular time. Further, for each determined component version, engine 102 may be configured to determine whether the software component version is/was included in a stream at a particular time. From these determinations, issue tracking engine 102 may determine which component versions included in an issue resolution at a particular time are included in a stream at a particular time. For the remainder of the detailed description, determining whether a software component version "was" included in a stream at a particular time (e.g., a queried time) covers a scenario in which the particular time is the current time. Thus, even if the particular time is the current time, an act of determining may still be referred to in the past tense, e.g., determining whether the software component version "was" included in a stream at a particular time.

Figure 6:
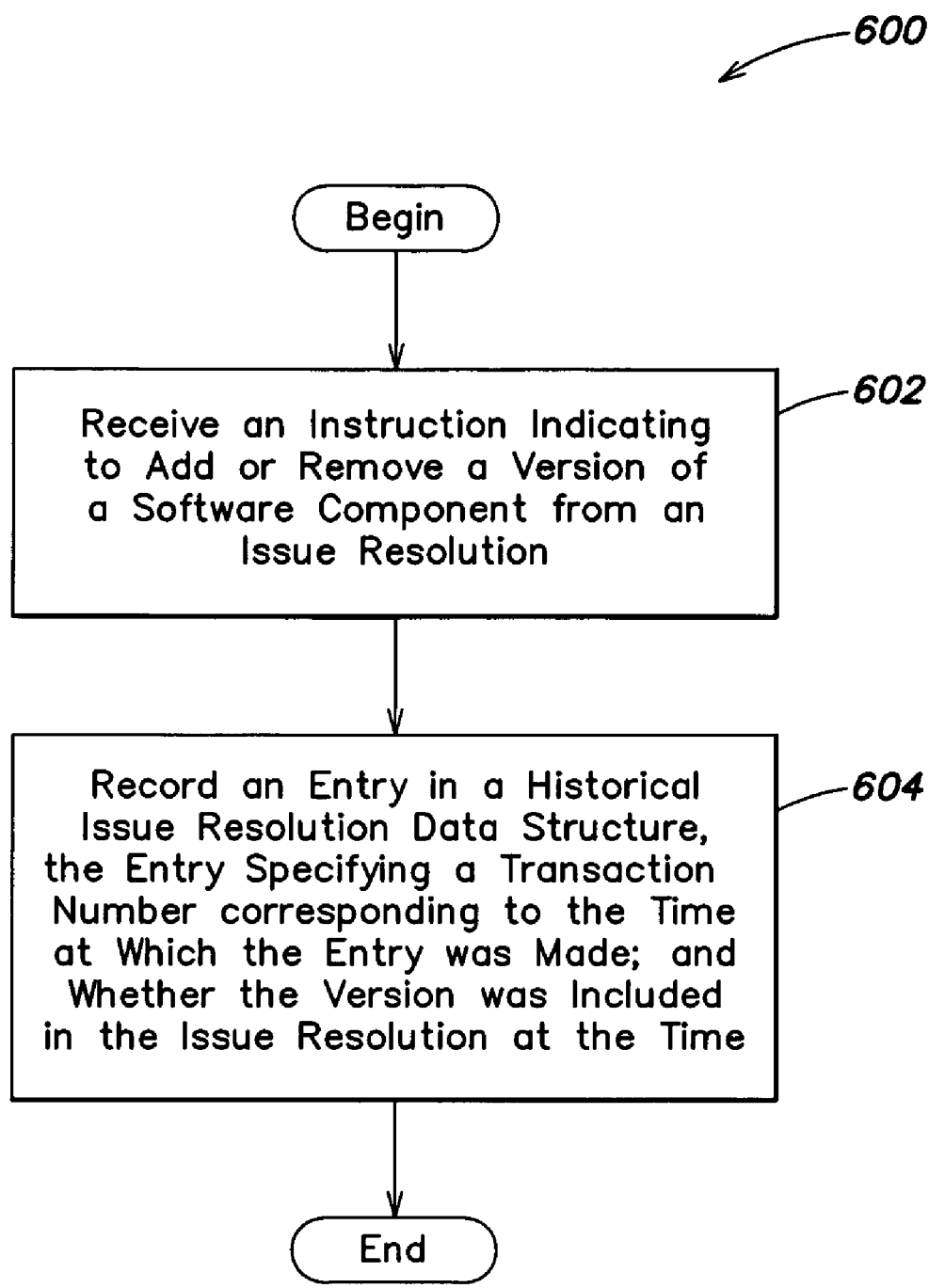
FIG. 6 is a flowchart illustrating an example of a method of adding or removing a version of a software component to/from and issue resolution.
Figure 7:
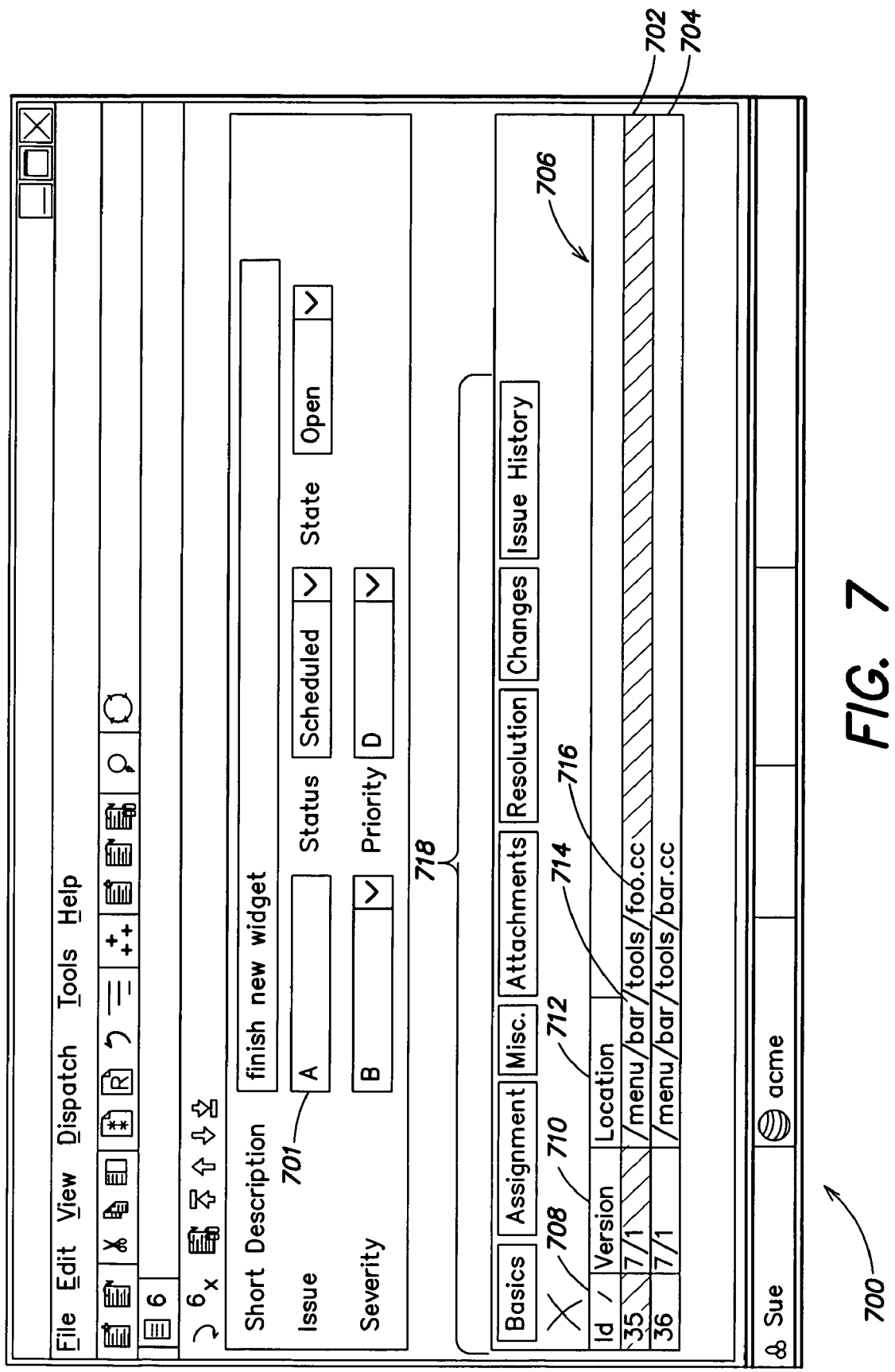
FIG. 7 illustrates an example of a GUI display for associating/disassociating versions of software components with/from an issue resolution.
Figure 20A:
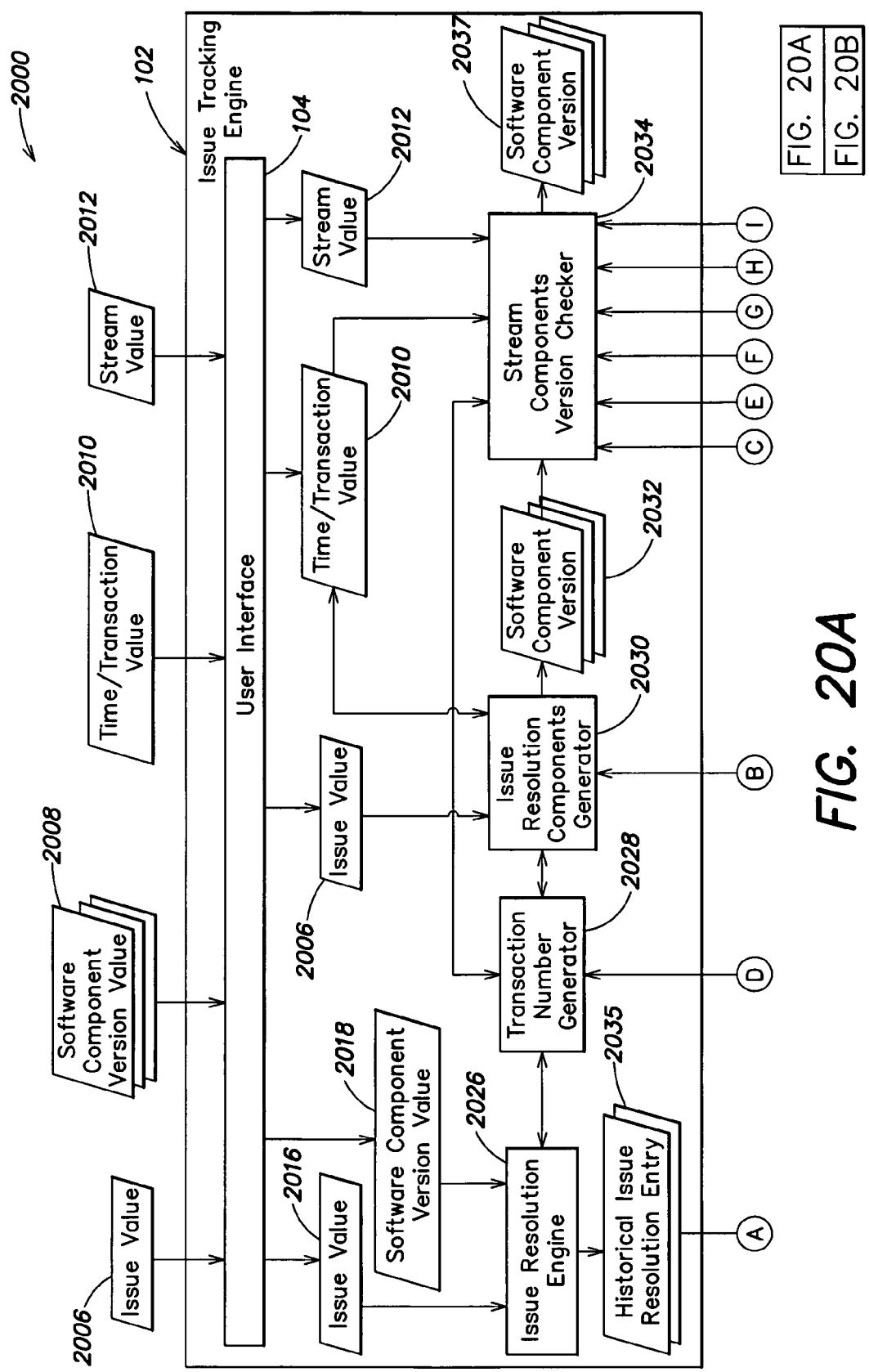
FIG. 20 is a block diagram illustrating an example of a system for modifying an issue resolution and for determining which software component versions of an issue resolution are included in a stream at a particular time.
Figure 20B:
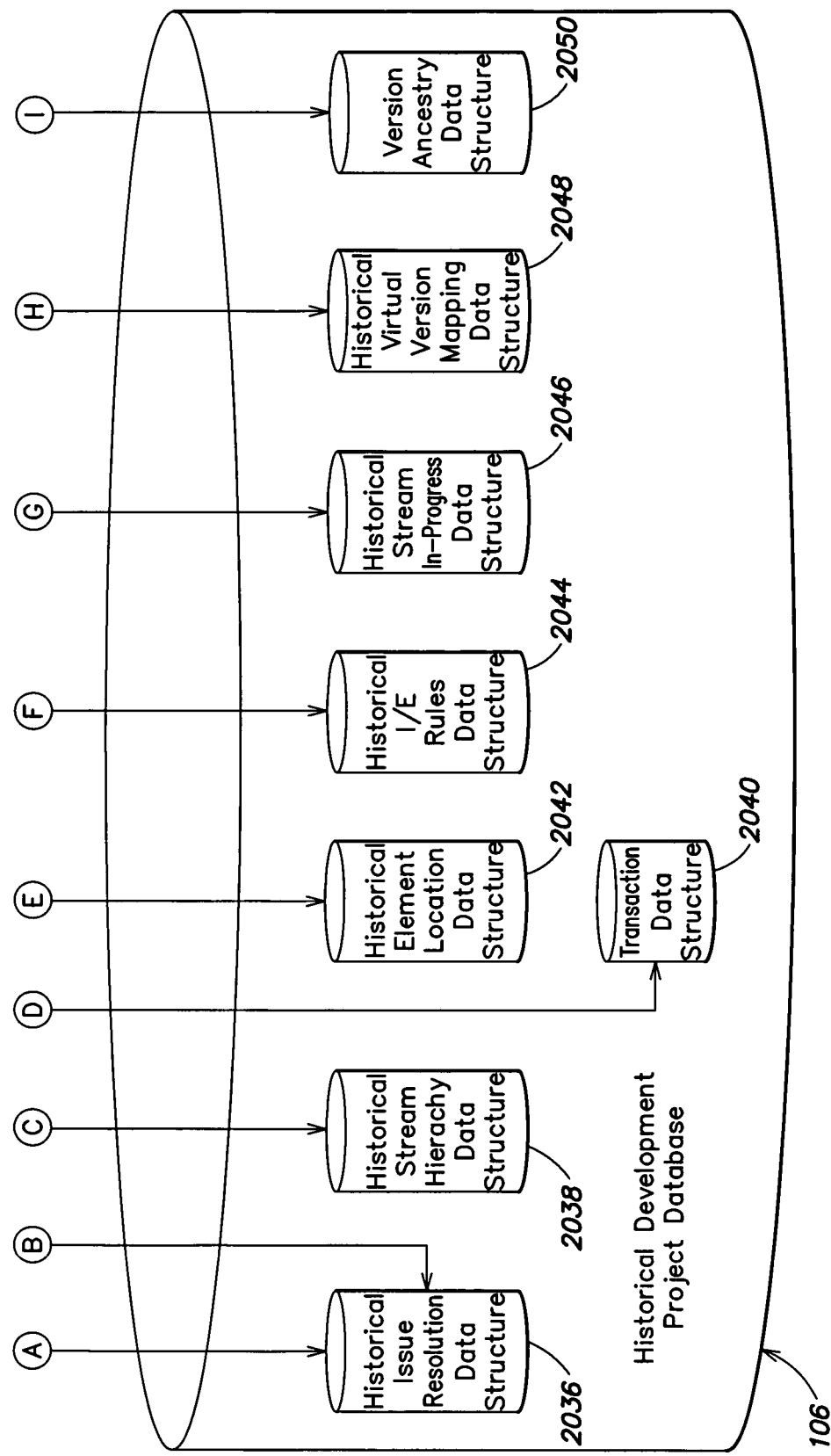
Figure 21:
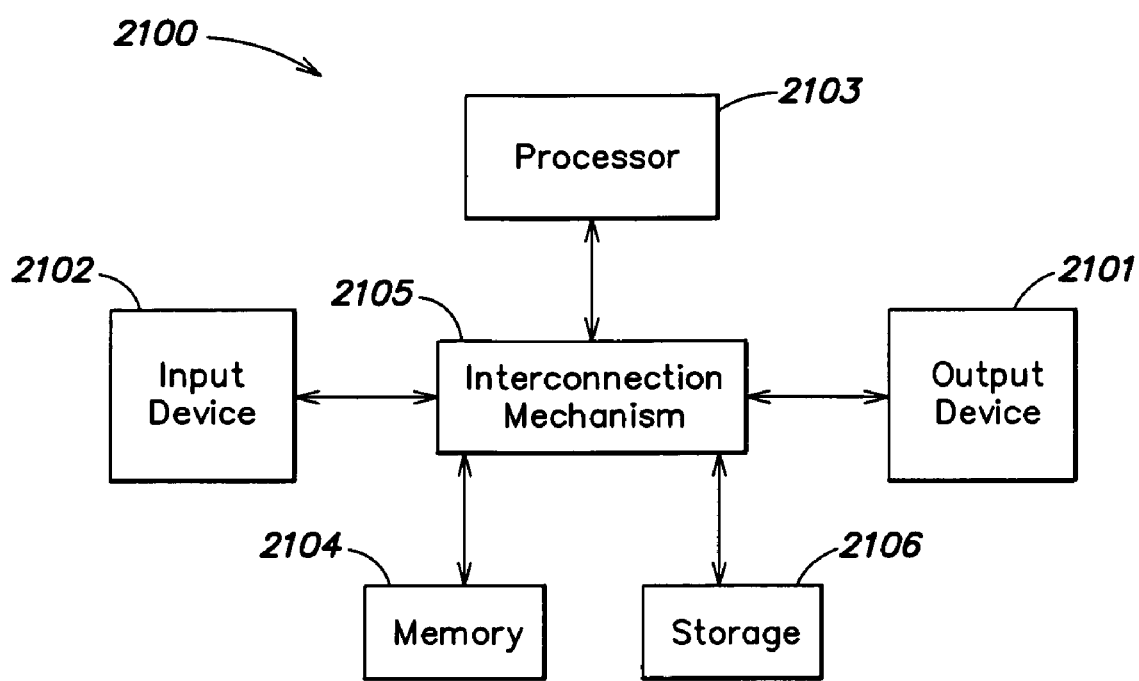
FIG. 21 is a block diagram illustrating an example of computer system that may be used to implement some embodiments of the invention.
Figure 22:
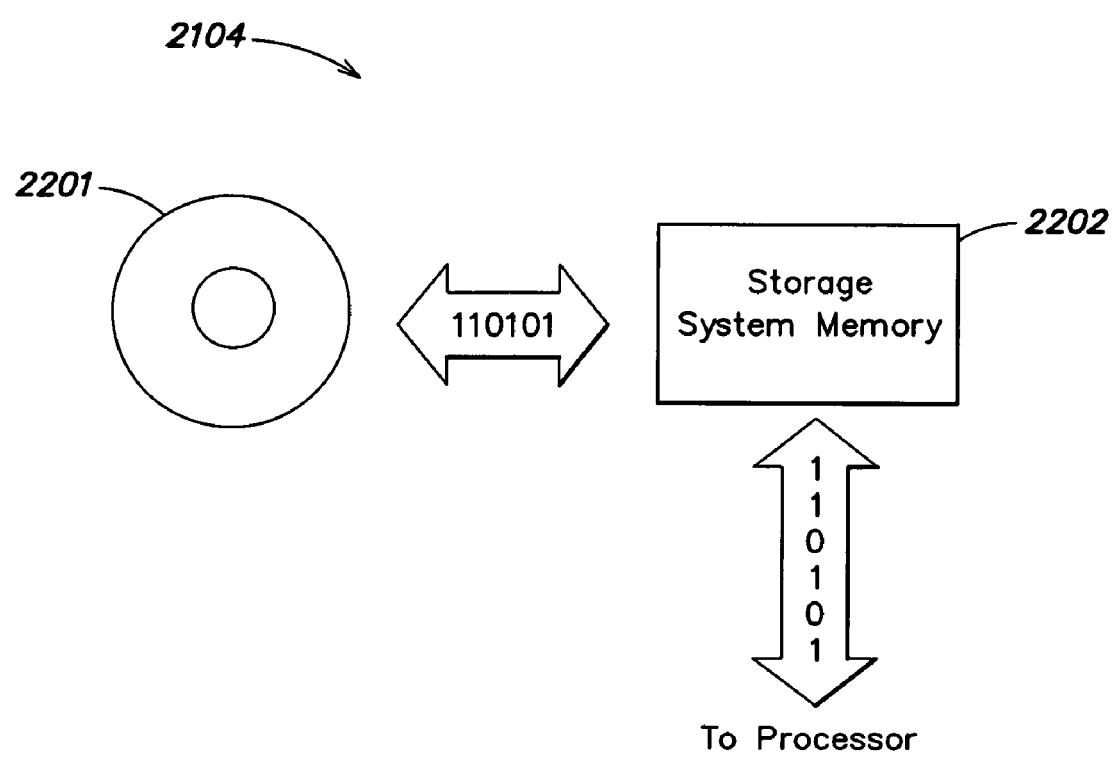
FIG. 22 is a block diagram illustrating an example embodiment of a memory system for the computer system of FIG. 21.

The remainder of the detailed description proceeds as follows: First, file hierarchies, stream hierarchies and software component versions (FIGS. 2-5) are discussed to provide context for the remaining description. This discussion is followed by an example of a method of modifying an issue resolution (e.g., associating and disassociating software component versions). (FIGS. 6 and 7). Next, various data structures that may be used in embodiments of the invention are described (FIGS. 8-12), followed by an example of a method of determining the software component versions of an issue resolution included in a stream at a particular time (FIGS. 13-19). The description concludes with a more detailed example of a system for modifying an issue resolution and for determining which software component versions of an issue resolution are included in a stream at a particular time (FIGS. 20-22).

FIG. 2 is a diagram illustrating an example of a file hierarchy 200. Directory 200 includes root directory 201. Root directory 201 includes directories 202, 208 and 210 and files 204, 206 and 212. Directory 202 includes directories 216 and 218, and file 214. Directory 218 includes directories 220 and 124, and directory 220 includes file 222. Directory 224 includes directory 232 and files 226, 228, 230 and 234.

File hierarchy 200, in particular File 206, is referred to throughout the remainder of the detailed description, as is the stream hierarchy 301 illustrated in FIG. 3, which will now be described.

FIG. 3 is an example of a screen shot illustrating an example of a GUI display 300 that includes a stream hierarchy 301. Stream hierarchy 301 includes streams 302, 304, 306, 308 and 310. Stream 302 is the source stream (defined above) of hierarchy 301, from which the remaining streams are derived, and streams 308 and 310 are workspaces (defined above). In some embodiments, any changes to a development project (e.g., adding, modifying and defuncting (e.g., deleting) files or directories) are initiated within a workspace.

It should be appreciated that a user may make changes to software components outside of the scope of the project itself. For example, some CM applications, such as those available from AccuRev, Inc., enable a user to create, change and delete software components (which may have originated within the project) on the user's computer, for example, using any of a variety of editors or software tools. However, the user has the option of specifying whether these changes are recorded as part of the project. If not recorded, the changes do not affect the software project. The systems and methods described herein are concerned with changes to a software project, not changes made by a user that are not recorded as part of the project. Accordingly, for the remainder of the detailed description, when software components are described as being modified, changed, added or removed from a workspace, it is meant that these transactions have been recorded as part of the workspace, unless otherwise specified.

If changes made within a workspace are to be made part of other versions (e.g., streams) of the project, the elements affected by the changes may be propagated up through the hierarchy to the source stream (e.g., source stream 302). As used herein, to "promote" means to propagate up a hierarchy, whereas "update" means to propagate down through a hierarchy. For example, a file added to workspace 310 then may be promoted to workspace 306, from which the file then may be promoted to source stream 302. Stream 304 then may be updated with the added file.

GUI display 300 may include visual indicators to assist a user in determining whether a stream is a workspace. For example, GUI display 300 provides workspace indicators 318 and 320 to indicate that streams 308 and 310, respectively, are workspaces. Other indicators may be used.

GUI display 300 also may include visual indicators to indicate when a stream is in progress. A stream is "in progress" when the stream includes one or more changes to a project (e.g., a new element, a modified element or a purged element) that have not been promoted to its parent stream. If a change in a first stream has not been promoted to the first stream's parent stream, then the first stream and its descendants include a change to the project that is not included in the other remaining streams. Accordingly, the contents of the first stream and its descendant streams are different than the contents of the remaining streams, such that the visual indicator indicates the existence of this difference.

GUI display 300 may include visual indicator 316 to indicate that stream 306 is in progress. For example, a directory may have been removed from workspace 310 and then promoted to stream 306, but not promoted (not yet at least) from stream 306 to source stream 302. Accordingly, visual indicator 316 indicates that stream 306 and its descendant 310 have different content than the remaining streams 304 and 308. This condition will remain until the changes are promoted from stream 306 to parent stream 302. Before the changes were promoted from workspace 310 to stream 306, a visual indicator may have been included in GUI display 300 to indicate that workspace 310 was in progress. Such a visual indicator may have been a same or different visual indicator than the visual indicator 316. It should be appreciated that such a visual indicator may be any kind of visual indicator and is not limited to the visual indicator 316 illustrated in FIG. 3.

Such an indicator may be beneficial for several reasons. For example, a user can determine from a glance at GUI display whether a particular stream has changes that have not been promoted. This quick look saves the user the time that typically would be required to open a stream and examine its contents. Another benefit is that a user (e.g., a supervisor or project team leader) can visually determine the progress (to an extent) of an entire project from a brief inspection of GUI display 300. Moreover, as a user becomes more familiar with GUI display 300, the information gleaned therefrom may become more intuitive.

As described above, each stream in a stream hierarchy (e.g., hierarchy 301) may inherit one or more properties from its ancestor streams. For example, unless an element is currently in progress within a stream (e.g., a workspace), the determination of whether or not the element is included within the stream may be determined based on ancestor streams, as will be described in more detail below.

In some embodiments, a stream's position within the hierarchy may change over time. For example, a stream's parent stream, and thus its ancestors, may be different than the parent stream and ancestors from which the stream was originally derived. For example, workspace 308 may originally have been created as a child of stream 306, and then moved in the hierarchy to be a child of stream 304. Accordingly, although element 308 originally inherited properties from stream 306 from which it was derived, element 308 no longer inherits properties from stream 306, but now inherits properties from source stream 304. In another example, element 308 may initially have been a child of source stream 302 and then moved to be a child of stream 304.

In some embodiments, a user interface (e.g., the GUI that provides GUI display 300) may enable a user to select a stream (e.g., any of streams 302-310). The user may be enabled to select a stream using any of a variety of types of input devices, for example, any of those described herein. The GUI preferably enables the user to move the location of a stream within a hierarchy such as, for example, by clicking and dragging a stream from one location to another on the GUI display 300. Further, such a GUI may enable the user to double-click on a stream or otherwise select a stream, resulting in the user being presented with a view of the stream, through which the user may modify the stream.

Having described directory hierarchies and stream hierarchies, software component versions will now be described.

As discussed above, a development effort may involve multiple developers working on multiple versions of a software project concurrently, each project version including a set of software component versions. In some CM applications, for example, those available from AccuRev, Inc. of Lexington, Mass., a distinction is made between a "virtual version" and a "real version" of a software component. This distinction may assist in tracking which versions of a software component are included in a stream (or other type of project version) at a particular time, as is discussed in more detail below in relation to FIGS. 13-19.

Typically, for a given software component included in a project, each version of the project includes a different "virtual version" of the software component. As used herein, a "virtual version" of a software component is an instance of the software component. A virtual version may have the same content as, or different content than, other virtual versions of the software component, including the software component from which it was created. Thus, although it is common in the field of software configuration management to refer to different instances of a software component (e.g., components in different branches of a project) as different "versions" of the component (even if the content of each "version" is in fact the same), such instances are referred to herein as "virtual versions."

As used herein, a "real version" is an edition of a software component having different content than the previous real version of a software component, from which the edition was created. Thus, if a change is made to a software component and recorded (as part of a project), a new real version of the software component may be created.

For example, referring to stream hierarchy 301 in FIG. 3 and directory hierarchy 200 of FIG. 2, if file 206 were created in workspace 308 and promoted to stream 304, the virtual version (i.e., instance) of file 206 in each stream would be different, although the real version (i.e., edition) of the file would be the same. If file 206 then were edited in workspace 310, workspace 310 would have a different real version of file 206 than workspace 308.

As used herein, a "version" of a software component (e.g., a file) or a "software component version" means the real version of the software component, not the virtual version of the software component. Thus, in determining a software component version included in an issue resolution or a stream, the real version of the software component is determined. As discussed above, in some embodiments of the invention, modifications to a software component (e.g., add, change, remove) are made in workspaces only. In such embodiments, each version (i.e., real version) of a software component may correspond to the workspace in which it was created.

Figure 4:
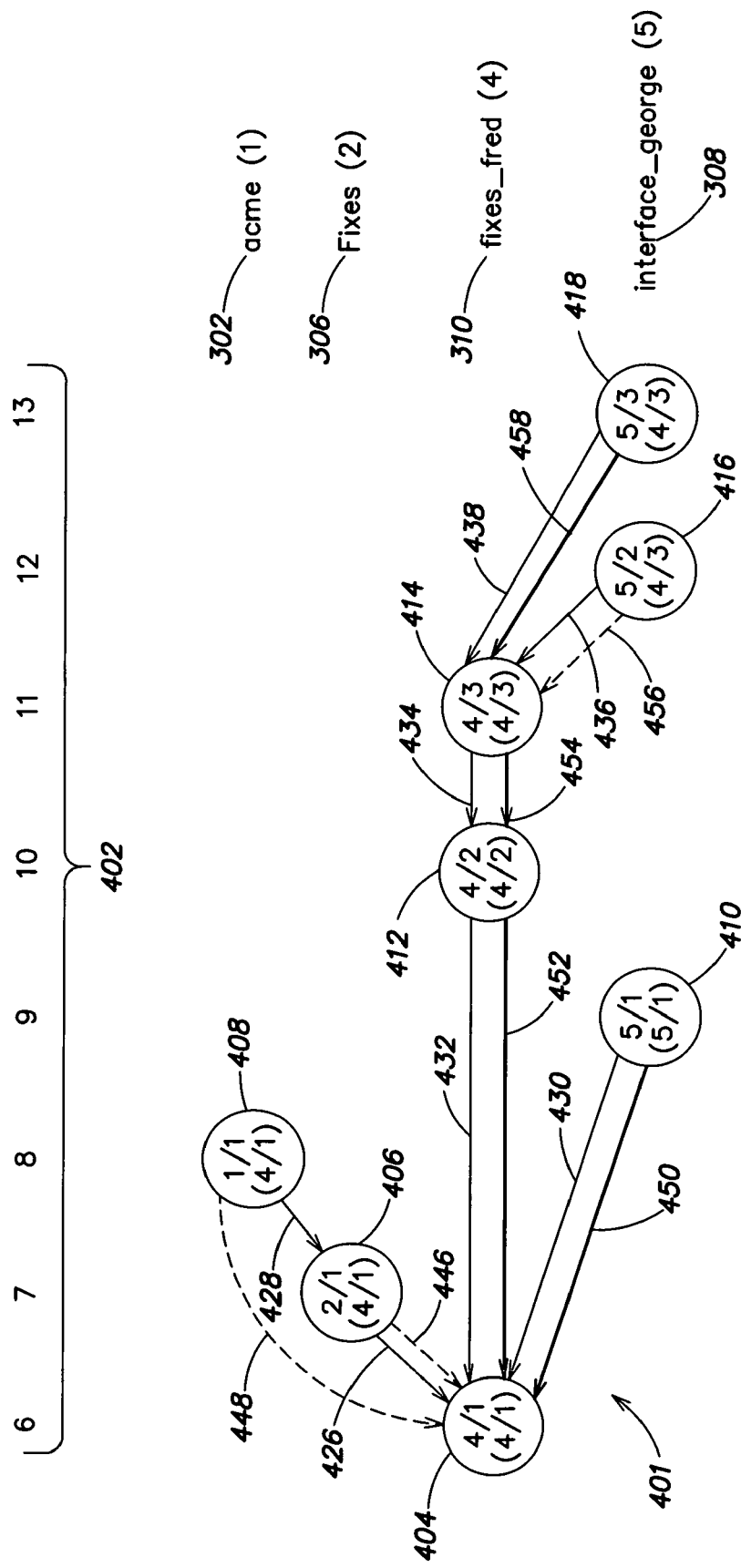
FIG. 4 is a diagram illustrating an example of an ancestry graph of a software component, including virtual versions of the software component.

FIG. 4 is a diagram illustrating an example of an ancestry graph 401 of a software component, including virtual versions of the software component. An "ancestry graph" of a software component is a conceptual representation of the relationships between versions of the software component. Ancestry graph 401, and ancestry graph 501 described below, provide a visual representation of a history of versions of a software component. These graphs may be referenced for a better understanding of embodiments of the invention described below. Examples of transactions that may result in these graphs are discussed below in relation to data structures 800-1200 shown in FIGS. 8-12.

In FIG. 4, the horizontal axis (i.e., from left to right) corresponds to time or transaction number, as indicated by the transaction numbers 402 running along the top of the figure (e.g., transaction numbers 6-13). The vertical axis in FIG. 4 corresponds to streams of a stream hierarchy, for example, streams 302, 306, 310 and 312 of stream hierarchy 301. For each stream shown in FIG. 4, the number following the name of the stream represents a stream ID of the stream. For example, for stream 302, the stream ID equals "1". Stream IDs are described in more detail below in relation to FIGS. 8-12. It should be appreciated that the order in which stream 302, 306, 310 and 312 are listed in FIG. 4 does not necessarily correlate to their position within stream hierarchy 301.

Version ancestry graph 401 includes graph elements 404-418. The horizontal position of each graph element corresponds to the transaction number that created the virtual version represented by the graph element, and the vertical position of the graph element represents the stream in which the virtual version represented by the graph element is included. As will be described in more detail below, in some embodiments of the invention, each version (i.e., real version or edition) of a software component is uniquely identified by a stream/edition pair (e.g., a stream ID/edition ID pair), and virtual version (i.e., instance) of a software component is uniquely identified by a stream/instance pair (e.g., a stream ID/instance ID pair). In each graph element 404-418, the virtual version represented by the element may be defined by the pair of numbers not surrounded by parenthesis, and the real version represented by each graph element may be defined by the pair of numbers surrounded by parenthesis.

For example, graph element 404 may represent a virtual version defined by stream/instance pair 4/1, corresponding to a real version defined by stream/edition pair 4/1. In other words, graph element 404 indicates that, in transaction 6, the first instance of the component in stream 310 (stream ID=4) was created, and this first instance corresponds to the first edition of the software component created in stream 310.

As another example, graph element 408 may represent a virtual version of the component identified by stream/instance pair 1/1, which corresponds to a real version defined by the stream/edition pair 4/1. In other words, graph element 408 indicates that, in transaction 8, the first instance of the component in stream 302 (stream ID=1) was created, and this first instance corresponds to the first edition of the software component created in stream 310.

It should be appreciated that each creation of a new version (i.e., a new edition) of a software component results in the creation of a new virtual version (i.e., a new instance) of the software component, but not all creations of a new virtual version of the software component result in the creation of a new real version. Further, several virtual versions of a software component may correspond to a same real version, as shown in FIG. 4.

The solid lines in FIG. 4 (e.g., 426, 428, 430, 432, 434, 436, and 438) may indicate an instance relationship—i.e., solid lines point from a first virtual version of a software component to a second virtual version of a software component from which the first version was created. The dashed lines (e.g., 446, 448 and 456) in FIG. 4 represent a relationship between a virtual version of a software component and it's corresponding real version—i.e., the dashed lines point from a virtual version of a software component to its corresponding real version. The bold lines (e.g., bold lines 450, 452, 454 and 458) in FIG. 4 represent a real version relationship—i.e., each bold line points from a first real version of a software component to a second real version of the software component from which the first real version was created.

Figure 5:
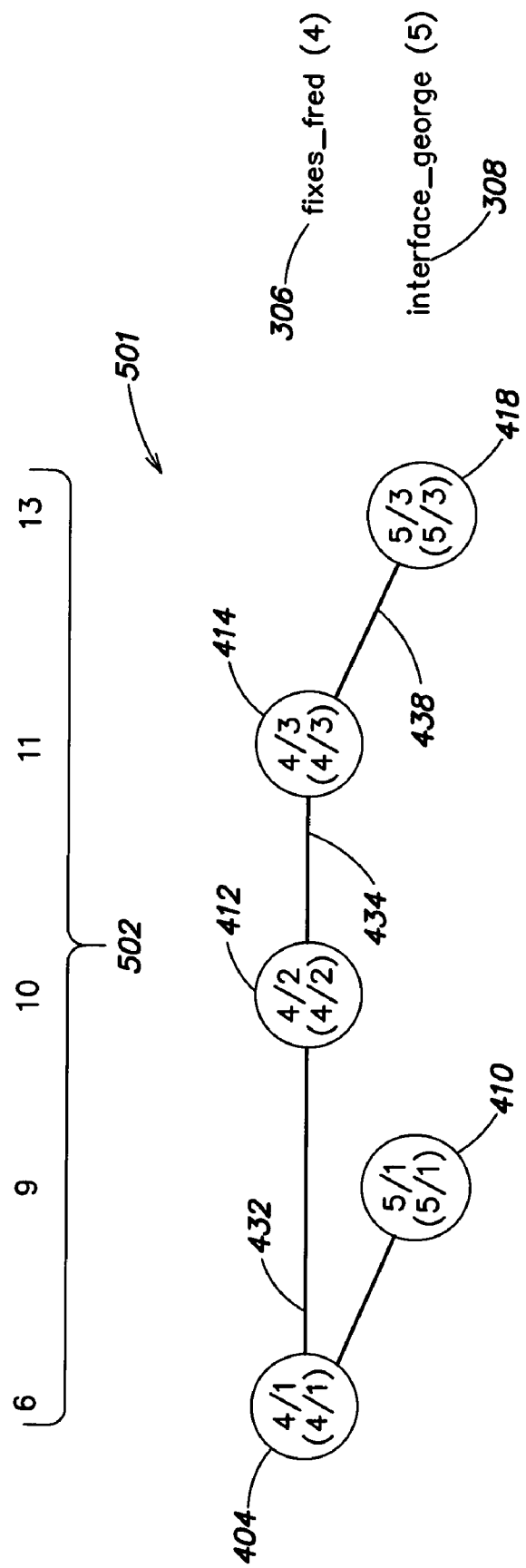
FIG. 5 is a diagram illustrating an example of an ancestry graph of a software component, not including virtual versions.

FIG. 5 is a diagram illustrating an example of an ancestry graph 501 of a software component, including only real versions of the software component, and not virtual versions. Thus, ancestry graph 501 only includes graph elements 404, 410, 412, 414, 418 corresponding to transactions 502 (6, 9, 10, 11 and 13). Ancestry graph 501 illustrates how a real-versions-only graph is simpler than an ancestry graph that includes virtual versions as well, such as graph 401. This simpler graph translates to simpler techniques for determining the ancestry of a software component version, as will be described below in more detail in relation to FIGS. 13-19.

FIG. 6 is a flowchart illustrating an example of a method 600 of adding or removing a version of a software component to/from and issue resolution.

In Act 602, an instruction indicating to add or remove a version of a software component from an issue resolution may be received. For example, a user may be presented with the GUI display shown in FIG. 7, and the user may select or enter an issue resolution and one or more software components to add/remove to/from the issue resolution.

Digressing briefly from method 600, FIG. 7 is a screen shot illustrating an example of a GUI display 700 for associating/disassociating versions of software components with/from an issue resolution. GUI display 700 may include an issue field 701 visually indicating the issue corresponding to the issue resolution. The GUI providing GUI display may enable a user to select or enter issue numbers in field 701.

GUI display 700 also may include component versions table 706 listing versions of software components included in the issue resolution corresponding to the issue specified in field 701. Table 706 may include one or more entries, for example, entries 702 and 704. Each entry may include a value for any of software component ID field 708, version field 710 and component location field 712. Table 706 may include more or less than the number of entries and fields shown in FIG. 7, and the order of entries 702-704 and field 708-712 may be different than as shown in FIG. 7.

For each entry, software component ID field 708 may hold a value representing a unique identifier for a software component, for example, an EID. For example, entry 702 specifies a software component ID of "35."

For each entry, version field 710 may hold a value representing a real version of a software component, for example, a stream/edition pair. For example, in entry 702, field 710 specifies real version 7/1. In other words, field 710 of entry 702 specifies the first edition, in the stream identified by stream ID "7" of the software component having an EID of "35."

For each entry, component location field 712 may specify the location of the software component version identified by fields 708 and 710. For example, the location may include a directory path portion 714 and a name portion 716. For example, in entry 702, component location field 712 specifies directory path "/menu bar/tools," and the name "foo.cc." The component location specified in field 712 may correspond to a position within a directory hierarchy, for example, within directory hierarchy 201.

The GUI providing GUI display 700 may enable a user to add and remove entries from table 706, and provide the requisite information for fields 708-712. Some of the information in fields 708-712 may be provided automatically in response to information being entered for other fields. For example, if a user selects and/or enters a component location in field 712, the component ID and version may be determined from this location and automatically provided in fields 708 and 710. The GUI that provides GUI display 700 may provide a variety of other displays, for example, displays corresponding to any of tabs 718.

Figure 8:
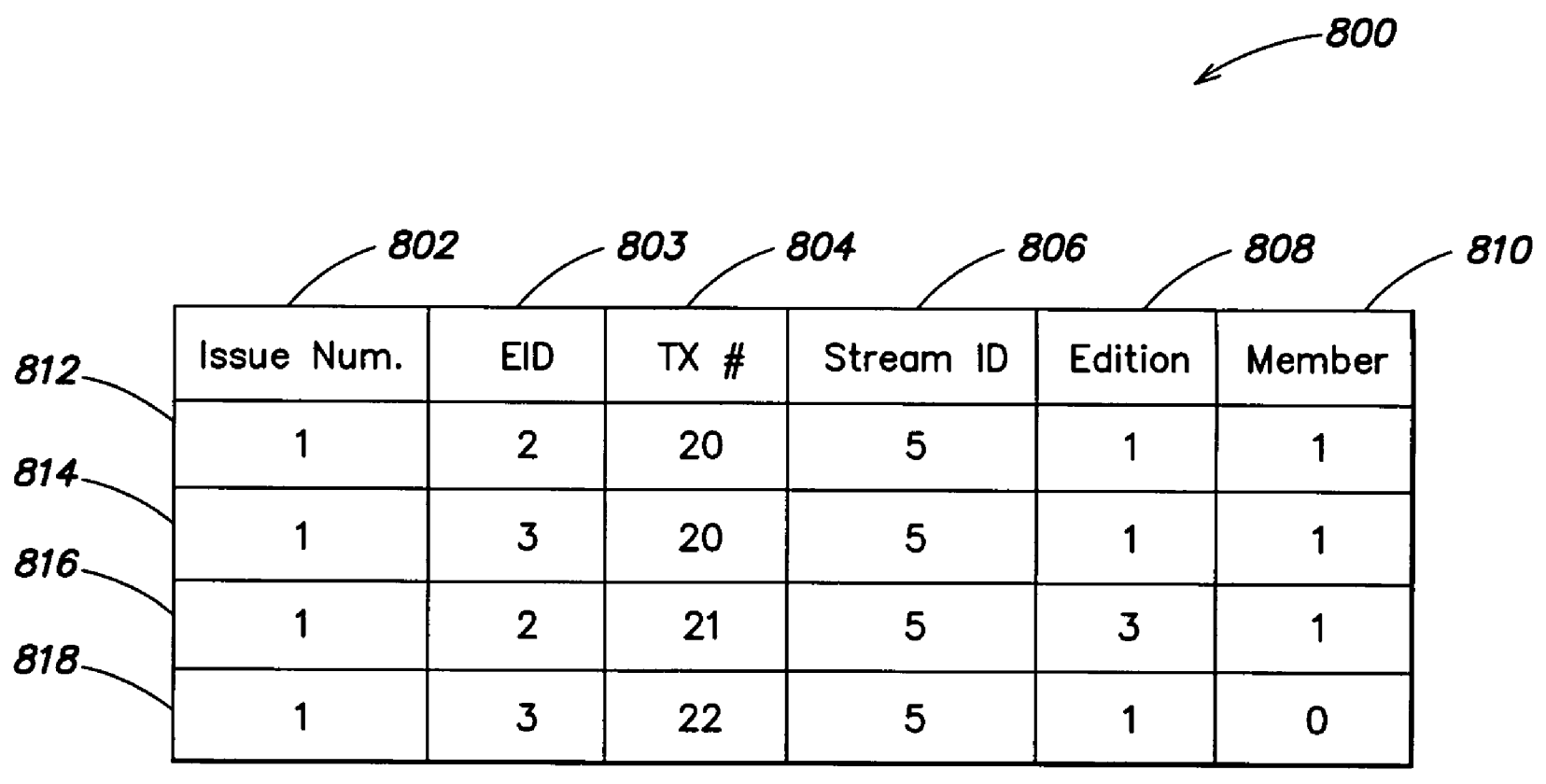

Returning to method 600, in Act 604, an entry may be recorded in a historical issue resolution data structure, for example, data structure 800 shown in FIG. 8. The entry may include any of a transaction number corresponding to the time in which the entry was made, and whether the version was included in the resolution at the time. For example, the entry may indicate that the entry was made in response to a software component version being added to the issue resolution or may indicate that the entry was made in response to a software component version being removed from an issue resolution.

Data structures 800, 900, 1000, 1100, and 1200, each of which may be used in determining which software component versions of an issue resolution are included in a stream at a particular time, will now be described. Table 1. below shows stream IDs of some of the streams of stream hierarchy 301 described above in relation to FIG. 3. The values in Table 1. are used to illustrate examples of the contents of data structures 800-1200, and are referred to throughout the specification.

FIG. 8 is a block diagram illustrating an example of a historical issue resolution data structure 800. Data structure 800 may represent a history of the changes made to one or more issue resolutions of a software development project (or other software entity) over time. Data structure 800 may be used to determine software component versions (i.e., real versions) included in an issue resolution at a particular time, as will be described below in more detail in relation to FIGS. 13 and 14.

Data structure 800 may include a plurality of entries, including entries 812-818. Each entry may include a value for any of: issue number field 802; software component (element) identifier (EID) field 803; transaction number field 804; stream ID field 806; edition field 808; and member field 810. The order of entries 812-818 and fields 802-810 may be different than as shown in FIG. 8.

TABLE 1

| Stream IDs of Streams | | |
| --- | --- | --- |
| Stream ID | FIG. 2 Identifier | Name |
| 1 | 302 | acme |
| 2 | 306 | fixes |
| 3 | 304 | interface |
| 4 | 310 | fixes_fred |
| 5 | 308 | interface_george |

For each entry, issue number field 802 may hold a value representing a unique identifier of an issue corresponding to the issue resolution. EID field 803 may hold a value representing a unique identifier of a software component. For example, referring to FIG. 2, file 206 may have an EID of 2. and file 204 may have an EID of 3. These EID values are used as examples throughout the detailed description.

For each entry, transaction number field 804 may hold a value representing a transaction number corresponding to the time at which the entry was made, and stream ID field 800 may hold a stream ID of the stream (e.g., the workspace) corresponding to the version (i.e., the real version) represented by the entry.

For each entry, field 808 may hold an edition ID corresponding to the version of the software component represented by the entry. Together, fields 804 and 806 may specify a stream/edition pair defining a real version of a software component. Member field 810 may hold a value representing whether the software component version represented by the entry is currently a member of the issue resolution represented by the entry. For example, an entry may have resulted from a software component version being added to (i.e., associated with) an issue resolution, in which case member field 810 may indicate that the software component version is a member at the time represented by transaction number field 804. Further, the entry may have resulted from the software component version being removed from (i.e., disassociated from) the issue resolution, in which case member field 810 may indicate that the software component version is not a member of the issue resolution at the time represented by transaction number field 804. The value held in member field 810 may be any of a variety of types, for example, a Boolean value where "1" means that the software component is a member at the time corresponding to the entry, and a value equal "0" means that the software component version is not a member of the issue resolution at the time corresponding to the entry.

Referring to FIG. 3 and Table 1. above, entries 812-818 may result from the following transactions. Entry 812 may have resulted from transaction twenty, which added the real version of file 206 (EID=2) defined by stream/edition pair 5/1 (e.g., the first edition of file 206 in stream 308) to the issue resolution of issue 1. Entry 814 may have resulted from transaction number twenty as well, in which real version 5/1 of file 204 (i.e., the first edition of file 204 (EID=3) in workspace 308) was added to the issue resolution of issue 1.

Entry 816 may have resulted from transaction twenty-one, in which real version 5/3 of file 206 (i.e., the third edition of file 206 in stream 308) was added to the issue resolution. As illustrated by the combination of entries 812 and 816 (and the combination of entries 814 and 818), if a later version of a software component is added to, or removed from, a historical issue resolution data structure (e.g., structure 800), entries made as a result of adding or removing previous versions of the software component still may remain in the historical data structure. Accordingly, a history may be maintained of the different versions of a same software component being included in an issue resolution at different times.

Entry 818 may have resulted from transaction twenty-two, in which real version 5/1 of file 204 (i.e., the first edition of file 204 in workspace 308) was removed from the issue resolution corresponding to issue 1. Accordingly, member field 810 may be set equal to "0" in entry 818.

Such transactions may have been performed by a user using the user interface display 700 described above in relation to FIG. 7.

Having described historical issue resolution data structure 800, data structures 900, 1000, 1100 and 1200 will now be described, each of which may be used in determining which software component versions of an issue resolution are included in a stream at a particular time.

Figure 9:
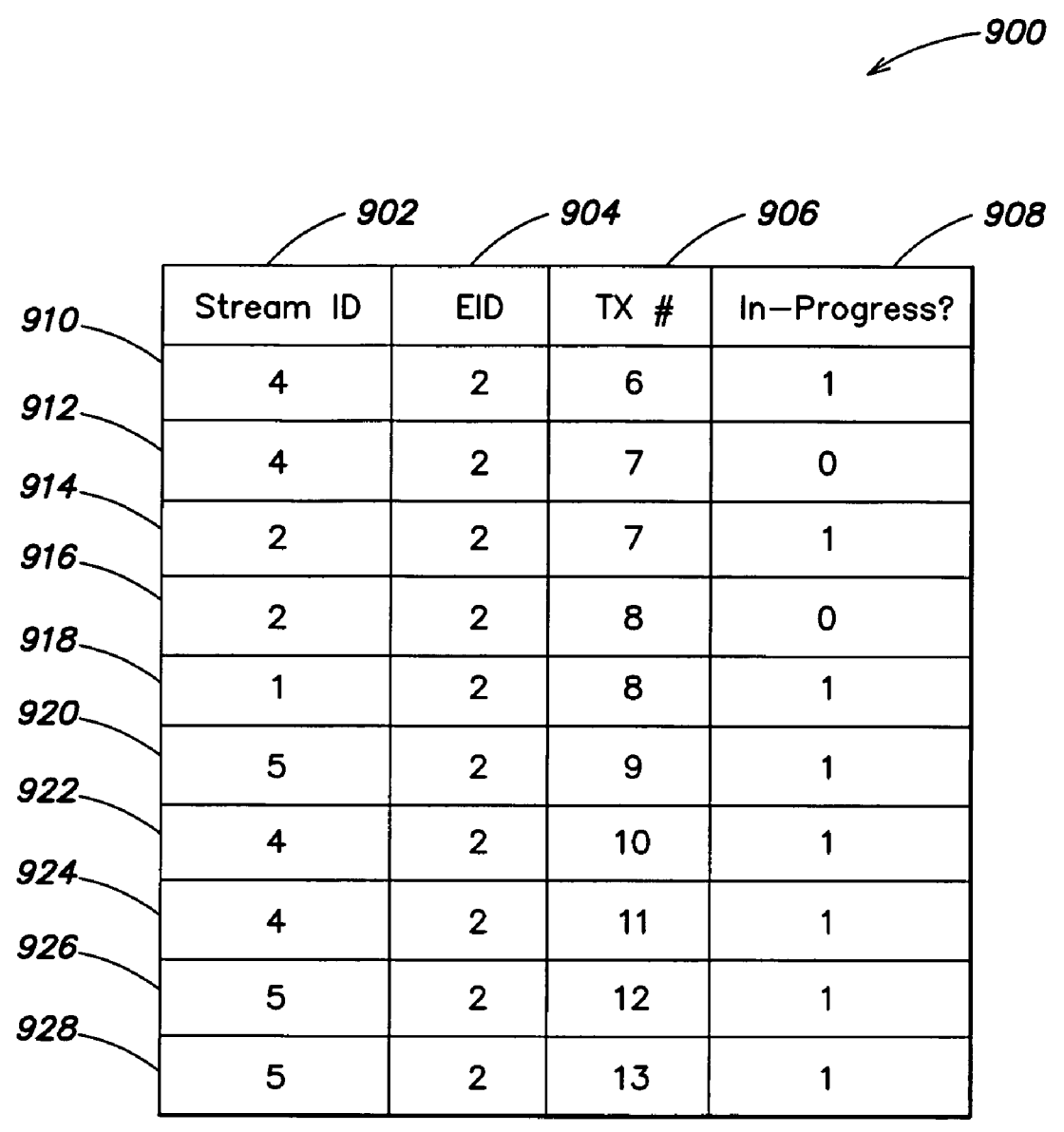

FIG. 9 is a block diagram illustrating an example of a historical stream in-progress data structure 900. Data structure 900 may represent a history of the software components (e.g., files and directories) in progress within streams of a software entity (e.g., for example, a software development project). As will be described in more detail below, data structure 900 may be used in determining the software component versions of an issue resolution included in a stream at a particular time. For example, data structure 900 may be used in determining whether software component versions are included in a queried stream at a queried time.

Data structure 900 may include a plurality of entries 910-928. Data structure 900 may include more or less than the number of entries and fields shown in FIG. 10, and the order of entries 910-928 and fields 902-908 may be different than as shown in FIG. 9.

Each entry may include a value for any of the following fields: stream ID field 902, EID field 904, transaction number field 906, and in-progress field 908. Stream ID field 902 may hold a value specifying an ID of the stream to which the entry applies. EID field 904 may hold the EID of the software component represented by the entry. Transaction field 906 may hold a value representing a transaction number or other value corresponding to a time at which the entry was made.

In-progress field 908 may hold a value indicating whether the software component is in progress for the stream at the time corresponding to the value of transaction field 906. As described above, a software component of a stream is "in progress" if a modification has been made to the software component (i.e., it has been added, modified, or removed) and the stream has not been promoted to a parent stream. If a software component is in progress within a stream, then the version of the software component in the stream and its children may be different than the version of the software component elsewhere within the stream hierarchy. For example, the software component may not even exist in other streams in the hierarchy. Alternatively, the software component may have been removed from the subject stream and its children, but still may be present in other streams of the stream hierarchy.

Each of entries 910-928 resulted from a transaction involving file 206 (EID=3). The transactions that resulted in entries 910-928 are described in more detail below in relation to how these transactions and others affect data structures 1000 and 1100, which will now be described.

FIG. 10 is a block diagram illustrating an example of a historical virtual version mapping data structure 1000, which may represent at least some of the information illustrated in ancestry graph 401 described above in relation to FIG. 4. Data structure 1000 may include a plurality of entries 1014-1028. Each entry may include a value for any of the following fields: EID field 1002, stream ID field 1004, instance ID field 1006, real stream ID field 1008, edition ID field 1010, and transaction number field 1012. Data structure 1000 may include more or less than the number of entries and fields shown in FIG. 10, and the order of entries 1014-1028 and fields 1002-1012 may be different than as shown in FIG. 10.

Each entry may specify a virtual version of a software component, the corresponding real version of the software component, and the transaction number of the transaction that created the virtual version of the software component. A new entry may be added to data structure 1000 each time a transaction results in a new virtual version of a software component.

For each entry, EID field 1002 may hold a value representing a unique identifier (e.g., a number) of a software component, and transaction number field 10 may hold a value representing a transaction number or other value corresponding to a time at which the entry was made.

Stream ID field 1004 may hold a value representing a stream ID of the stream of a virtual version of the software component specified in field 1002. Field 1006 may hold a value representing an identifier of the instance of the virtual version of the software component specified in field 1002. Thus, the combination of fields 1004 and 1006 may hold values specifying a stream/instance pair defining the virtual version of the software component specified in field 1002, created at a time corresponding to the transaction number specified in field 1012.

Fields 1008 and 1010 may hold a stream ID and an edition ID, respectively, this combination defining the real version of the software component corresponding to the virtual version defined by fields 1004 and 1006.

The transactions that resulted in entries 1014-1028 are described below after the description of data structure 1100.

FIG. 11 is a block diagram illustrating an example of a version ancestry data structure 1100, which may represent at least some of the information illustrated in ancestry graph 501 described above in relation to FIG. 5. Data structure 1100 may include a plurality of entries 1112-1118. Each entry may include a value for any of the following fields: EID field 1102, parent stream field 1104, parent edition field 1106, child stream field 1108, and child edition field 1110. Data structure 1100 may include more or less than the number of entries in fields shown in FIG. 10, and the order of entries 1112-1118 and fields 1102-1110 may be different than as shown in FIG. 11.

Each entry of data structure 1100 may specify a parent/child relationship between real versions of a software component. As used herein, a "parent" version of a particular version of a software component is the version from which the particular version was created. Conversely, a "child" version of a particular version of a software component is a version created from the particular version. A new entry may be added to data structure 1100 each time a transaction results in the creation of a new real version of a software component.

For each entry, EID field 1102 may hold a value representing a unique identifier (e.g., a number) of a software component. The combination of fields 1104 and 1106 may hold values specifying a unique stream/edition pair defining a real version of the software component specified by field 1102. This real version is the parent of the real version defined by the unique stream/real version pair specified by fields 1108 and 1110.

Having now described the arrangement of data structures 900, 1000, and 1100, examples of transactions that may result in the entries of these data structures illustrated in FIGS. 8-10 will now be described. Reference should be made to the element hierarchy 200 in FIG. 2, the stream hierarchy 301 in FIG. 3, and Table 1. Reference should also be made to ancestry graphs 401 and 501 of FIGS. 4 and 5, respectively, which provide a visual representation of information represented in data structures 900-1100.

In transaction six, file 206 may have been created in workspace 310, resulting in the creation of a new virtual version and a new real version of file 206. This transaction may have resulted in entry 910 of data structure 900 and entry 1014 of data structure 1000. As indicated by entry 910, because file 206 is yet to be promoted from workspace 310 to stream 306, in-progress field 908 indicates that file 206 is in progress in workspace 310. Field 1014 of data structure 1000 indicates that the virtual version (4/1) and the real version (4/1) resulting from transaction six are the same.

Transaction six does not result in the creation of an entry in data structure 1100 because file 206 is a new file for which version ancestry has not yet been established.

In transaction seven, file 206 may be promoted from stream 310 to stream 306, resulting in the creation of a new virtual version of file 206. Transaction seven may result in entries 912 and 914 in data structure 900 and entry 1016 in data structure 1000. As indicated by entries 912 and 914, as a result of transaction seven, file 206 is no longer in-progress in workspace 310, but is in-progress in stream 306. Entry 1016 in data structure 1000 indicates that virtual version (i.e., stream/instance pair) 2/1 corresponds to real version (i.e., stream/edition pair) 4/1. Transaction seven does not result in the creation of an entry in data structure 1100 because transaction seven did not result in the creation of a new real version of the file 206, but merely the creation of a new virtual version.

In transaction eight, file 206 may be promoted from stream 306 to source stream 302, resulting in the creation of a new virtual version of file 206. Transaction eight may result in entries 916 and 918 of data structure 900 and entry 1018 of data structure 1000. Transaction eight does not result in the creation of an entry in data structure 1100 because a new version of file 206 has not been created.

In transaction nine, file 206 may be modified in workspace 308 and the modification recorded to create a new virtual version and a new real version of file 206. Transaction nine may result in entry 920 in data structure 900, entry 1020 in data structure 1000 and entry 1112 in data structure 1100. Entry 1112 reflects that real version 5/1 was created from real version 4/1.

In transaction ten, file 206 may be modified in workspace 310 and the modification recorded to create a new virtual version and a new real version of file 206. Transaction ten may result in entry 922 in data structure 900, entry 1022 in data structure 1000 and entry 1114 in data structure 1100. Entry 1114 indicates that new real version 4/2 was created from real version 4/1.

In transaction eleven, file 206 may be modified in stream 310 and the modification recorded to create a new virtual version and a new real version of file 206. Transaction eleven may result in entry 924 in data structure 900, entry 1024 in data structure 1000 and entry 1116 in data structure 1100.

In transaction twelve, file 206 may be sent from workspace 310 to workspace 308, thereby creating a new virtual version of file 206. In other words, rather than promoting file 206 from workspace 310 to stream 306 to stream 302, a user (e.g., a developer, project leader, etc.) may directly send (e.g., copy and paste) file 206 from workspace 310 to workspace 308, thereby replacing whatever version of file 206 currently resides in workspace 308. For example, a user interface (e.g., a GUI) may enable a user to specify file 206 (e.g., by typing in an identifier or selecting it from a user interface display), and send file 206 to workspace 308.

Transaction twelve may result in entry 926 in data structure 900 and entry 1026 in data structure 1000. Entry 1026 of data structure 1000 indicates that virtual version 5/2 of the file 206 created in workspace 308 corresponds to real version 4/3 of the software component in workspace 310. It should be appreciated that transaction twelve did not result in an entry in data structure 1100 because the sending of file 206 did not result in the creation of a new real version.

In transaction thirteen, file 206 may be modified in workspace 308 and the modification recorded to create a new virtual version and a new real version of file 206. Transaction thirteen may result in entry 928 in data structure 900, entry 1028 in data structure 1000 and entry 1118 in data structure 1100. Entry 1118 indicates that the new real version 5/3 of file 206 was created from real version 4/3 of file 206.

Another data structure that may be used in determining which software component versions of an issue resolution are included in a stream at a particular time is data structure 1200 of FIG. 12. FIG. 12 is a block diagram illustrating an example of a historical stream hierarchy data structure 1200.

As described above in relation to FIG. 3, the position of a stream within a stream hierarchy may change over time. Data structure 1200 may be used to record these changes such that the state of the stream hierarchy at a particular time (e.g., a past time) may be determined. Further, a stream ancestry chain of a stream may be determined using data structure 1200, for example, as described below in relation to FIGS. 15 and 16.

Data structure 1200 may include a plurality of entries 1210-1218. Each entry may hold a value for any of the following fields: stream ID field 1202; name field 1204; parent stream ID field 1206; and transaction field 1208.

For an entry: stream ID field 1202 may hold a unique identifier for a stream; name field 1204 may hold a name of the stream identified in field 1202; parent stream ID field 1206 may hold a unique identifier of the parent stream of the stream identified in field 1202; and transaction field 1208 may hold a transaction number (or another value corresponding to a time at which the entry was created). Each entry may have been created to record a change of a name of a field or a change of a relationship between a stream and its parent (i.e., a change of location within the stream hierarchy). For example, entries 1210-1224 may have resulted from the following transactions, which may be better understood with reference to Table 1. and FIG. 3.

Entry 1210 may have resulted from the creation of stream 302 ("acme"). In some embodiments, a parent stream ID of "0" may be assigned as the stream ID of a parent of a source stream because such a value is not eligible to be a stream ID of a stream. Thus, a parent stream ID equal to "0" may serve as an indication that an entry in data structure 1200, for example, entry 1210, represents a source stream (e.g., stream 302). Other values may be used as a parent stream ID, as long as the value is not eligible to be a stream ID of a stream.

Entries 1212 and 1214 may have resulted from the creation of streams 306 and 304, respectively, as children of source stream 302. Entry 1216 may have resulted from the creation of stream 310 as a child of stream 306, and entry 1218 may have resulted from the creation of stream 318 as a child of stream 304.

Data structure 1200 may represent a history of stream hierarchy 301. It should be appreciated that data hierarchy 1200 is merely one example of how stream hierarchy 301 may have been formed. Stream hierarchy 301 may have been formed in any of a variety of ways, resulting in one or more entries in historical stream hierarchy data structure 1200 different from those depicted in FIG. 12. For example, in the Poole application, historical stream hierarchy data structure 1000 illustrates entries resulting from a change of a stream's name and a change in a stream's position within a stream hierarchy.

Having now described data structures 800-1200, which may be used in a method of determining which software component versions of an issue resolution are included in a stream at a particular time, an example of such a method will now be described.

Figure 13:
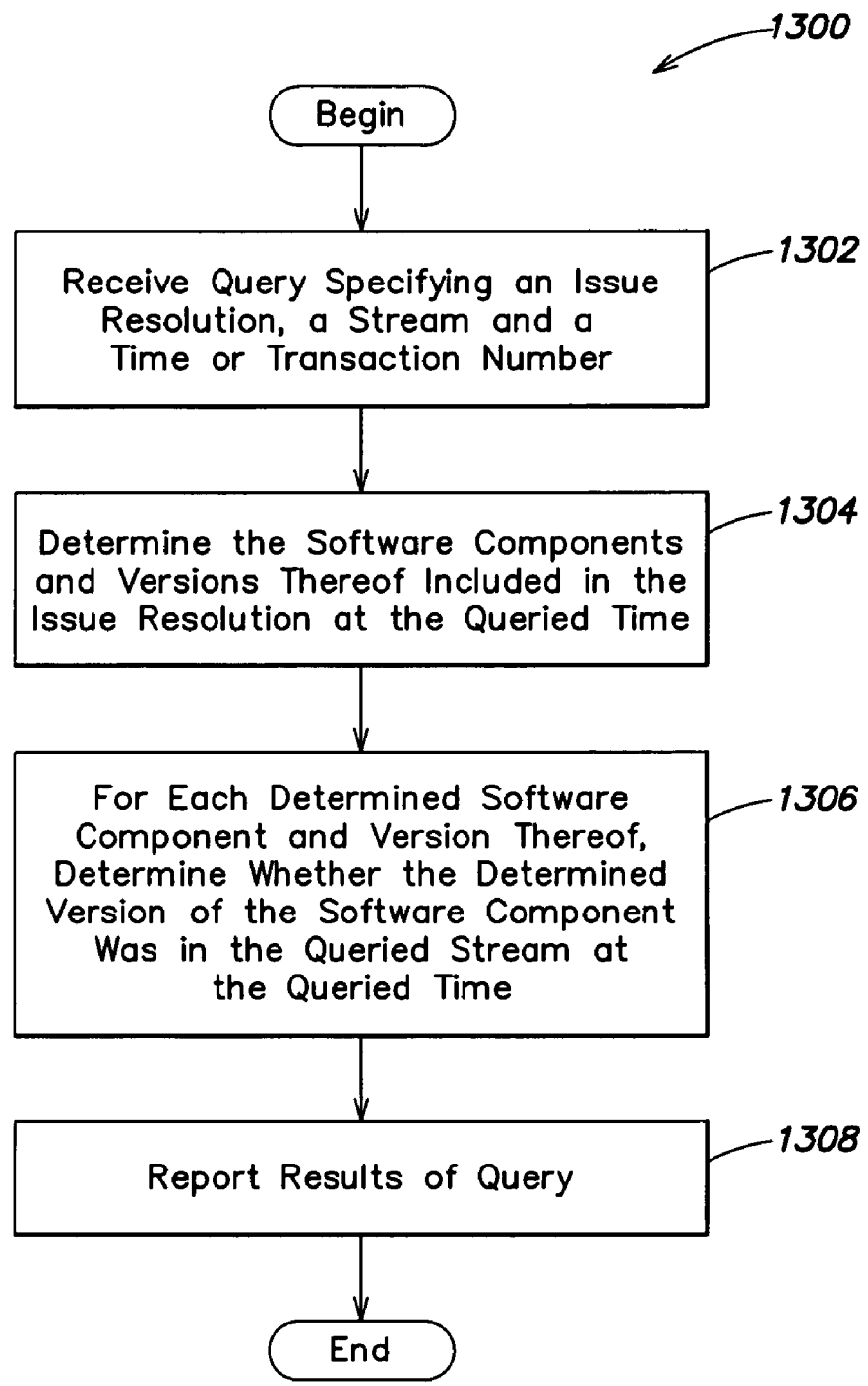
FIG. 13 is a flowchart illustrating an example of a method of determining the software component versions of an issue resolution included in a stream at a particular time.

FIG. 13 is flow chart illustrating an example of a method 1300 of determining the software component versions of an issue resolution included in a stream at a particular time. Method 1300 is merely an illustrative embodiment of a method of determining software component versions of an issue resolution included in a stream at a particular time, and is not intended to limit the scope of the invention. Any of numerous other implementations of such a method, for example, variations of method 1300, are possible and are intended to fall within the scope of the invention.

In Act 1302, a query may be received. The query may specify any of an issue resolution, a stream and a time or transaction number. A time specified by a query may be a standard time (e.g., Jan. 2, 2004, 1:52:15). If no time or transaction number is specified by the query, time may default to the time at which the query was received. For example, a user may simply select an issue resolution (e.g., using a user interface display such as GUI display 700 described above) without specifying any time at all.

If the query specifies a time, then the time may be translated into a transaction number, for example, by accessing a transaction data structure (e.g., such as the one described above) that maintains a mapping between transaction numbers and time. For example, the time may be translated to the transaction number of the transaction recorded closest to and preceding the time specified in the query.

As used herein, a "queried time" is either the time specified by the query or a time corresponding to the transaction number specified by the query. The time corresponding to a transaction number may be the time indicated in the entry of the transaction data structure, or an index derived therefrom, that represents the transaction identified by the transaction number. Unless otherwise stated, throughout the description of method 1300, the queried time will be a time corresponding to transaction 22 or later (e.g., a present time). Further, unless otherwise stated, the specified issue is issue 1 and the specified stream is stream 308 ("interface_george", EID=5).

In Act 1304, the software component versions included in the issue resolution at the queried time may be determined, for example, as described below in relation to method 1400.

In Act 1306, for each software component version determined in Act 1304, it may be determine whether such software component version was in the queried stream at the queried time. For example, Act 1306 may be performed as described below in relation to Act 1500.

In Act 1308, the results of the query may be reported. For example, the results of the query may be displayed to a user on a user interface display, stored in a data structure (e.g., on a volatile medium such as local memory for temporary use or on a non-volatile medium for more permanent use), communicated across a network, etc. In some embodiments, a user interface (e.g., GUI) display may present the results of the query in a tabular format, where each row of a table represents a software component version. In such embodiments, each row may hold a value representing any value stored in any of fields 802-810 of data structure 800 described above, and may include values for other fields as well, for example, a software component name and/or a stream name.

Method 1300 may include additional acts. Further, the order of the acts performed as part of method 1300 is not limited to the order illustrated in FIG. 13, as the acts may be performed in other orders and/or one or more of the acts may be performed in parallel (at least partially).

Figure 14:
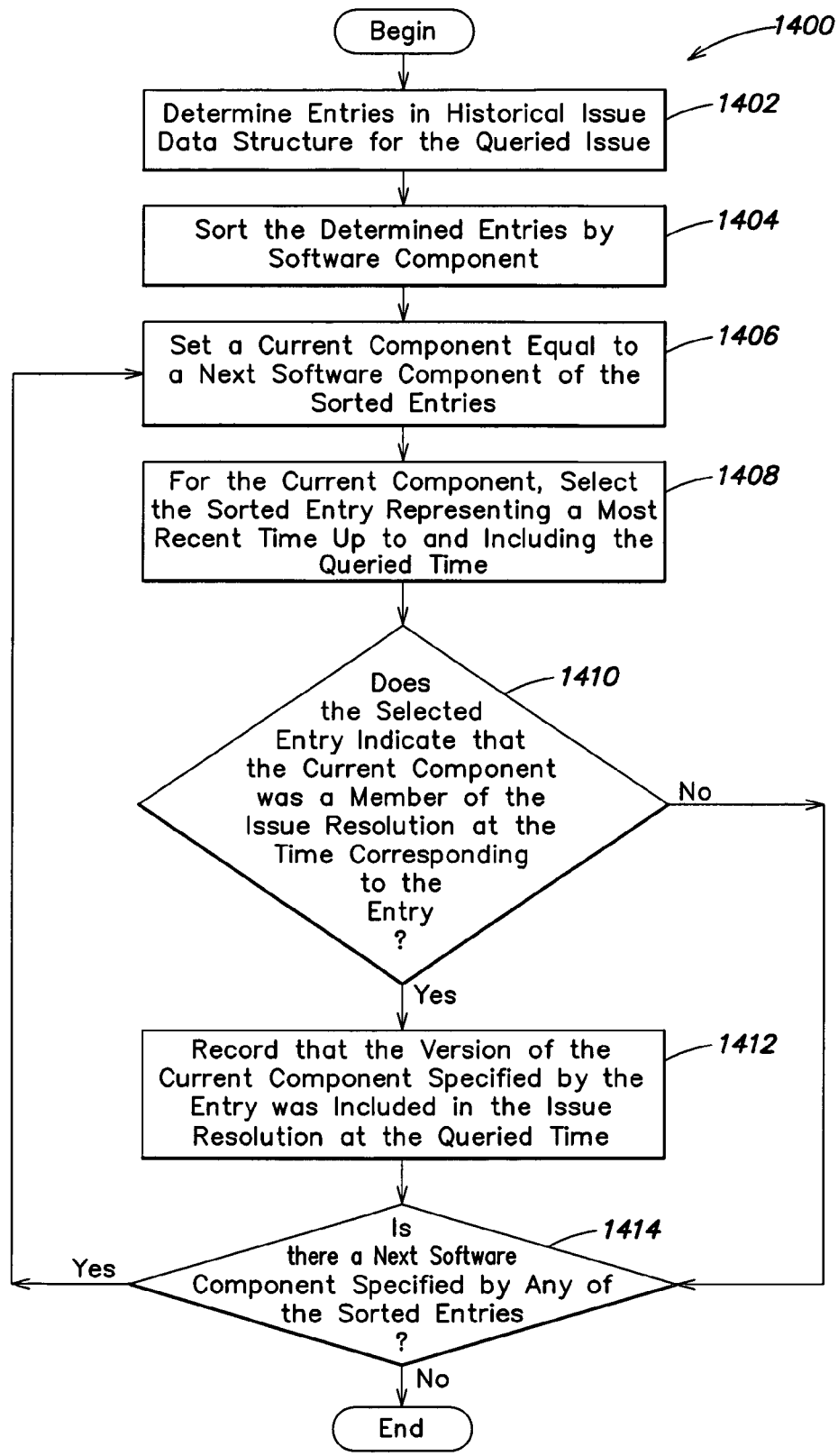
FIG. 14 is a flowchart illustrating an example of a method of determining the software component versions included in an issue resolution at a particular time.

FIG. 14 is a flowchart illustrating an example of a method 1400 of determining the software component versions included in an issue resolution at a particular time, for example, a present time or a time in the past. Method 1400 is merely an illustrative embodiment of a method of determining the software component versions included in issue resolution at a particular time, and is not intended to limit the scope of the invention. Any of numerous other implementations of such a method, for example, variations of method 1400, are possible and are intended to fall within the scope of the invention.

In Act 1402, entries in a historical issue resolution data structure that correspond to the queried issue may be determined. For example, referring to data structure 800 described above, if the query specifies issue 1, then entries 812-818 may be determined in Act 1402. It should be appreciated that data structure 800 may include entries corresponding to issues other than issue 1.

In Act 1404, the entries determined in Act 1402 may be sorted according to software component (e.g., by software component identifier). For example, entries 812 and 816, which each specify software component 206 (EID=2), may be sorted together, and entries 814 and 818, which each specify software component 204 (EID=3), may be sorted together.

In Act 1406, a current component variable may be set equal to a next software component of the sorted entries. Act 1406 may represent a first act of a computational loop including Acts 1406-1412, where the loop is performed once for each software component represented by at least one of the sorted entries. For example, for entries 812-818, the computational loop may be performed twice, once for software component 206 (EID=2) and once for software component 204 (EID=3). Accordingly, for a first pass through the loop, Act 1406 may set a current component variable equal to "2."

In Act 1408, for the current component, the sorted entry representing a most recent time (e.g., a highest transaction number) up to and including the queried time may be selected. For example, from entries 812 and 816 for the current component, entry 816 may be selected because entry 816 specifies transaction number 21, which is higher than transaction number 20 specified by entry 812.

In Act 1410, it may be determined whether the entry selected in Act 1408 indicates that the current component was a member of the issue resolution at the time corresponding to the entry. For example, Act 1410 may involve accessing the value stored in member field 810 of the selected entry. In the case where the selected entry is entry 816, Act 1410 may determine that the current component was a member of the issue resolution at the time corresponding to transaction 21 because the value of member field 810 is "1." Alternatively, if the selected entry was entry 818 (e.g., during a second pass through the computational loop of Acts 1406-1412), then Act 1410 may determine that the current component (file 204 having EID="3") was not a member of the issue resolution at the time corresponding to transaction 22 because the value of member field 810 is "0."

If it is determined in Act 1410 that the current component was not a member of the issue resolution at the current time, then in Act 1414, it may be determined whether there is a next software component specified by any of the sorted entries. If not, method 1400 may end, whereas if there is a next software component, then method 1400 may proceed to Act 1406.

If it is determined in Act 1410 that the current component was a member of the issue resolution at the time corresponding to the entry, then in Act 1412, it may be recorded (e.g., temporarily in local memory) that the version of the current component specified by the entry was included in the issue resolution at the queried time. For example, the stream/edition pair specified by the combination of fields 806 and 808 of the selected entry may be recorded. The record then may be accessed throughout performance of method 1300, for example, during performance of Act 1306.

In an example using the data of data structure 800, method 1400 (and/or Act 1304) may determine that only a single software component, file 206 (EID=2) is included in issue resolution at the queried time. Although data structure 800 includes entries for file 204 (EID=3), method 1400 may determine that file 204 was not a member of the issue resolution at the queried time. For example, Acts 1406-1410 may determine that the most recent entry 818 for file 206 indicates in field 810 that file 204 is not a member of issue resolution 1 at the queried time.

Method 1400 may include additional acts. Further, the order of the acts performed as part of method 1400 is not limited to the order illustrated in FIG. 16, as the acts may be performed in other orders and/or one or more of the acts may be performed in parallel (at least partially).

Figure 15:
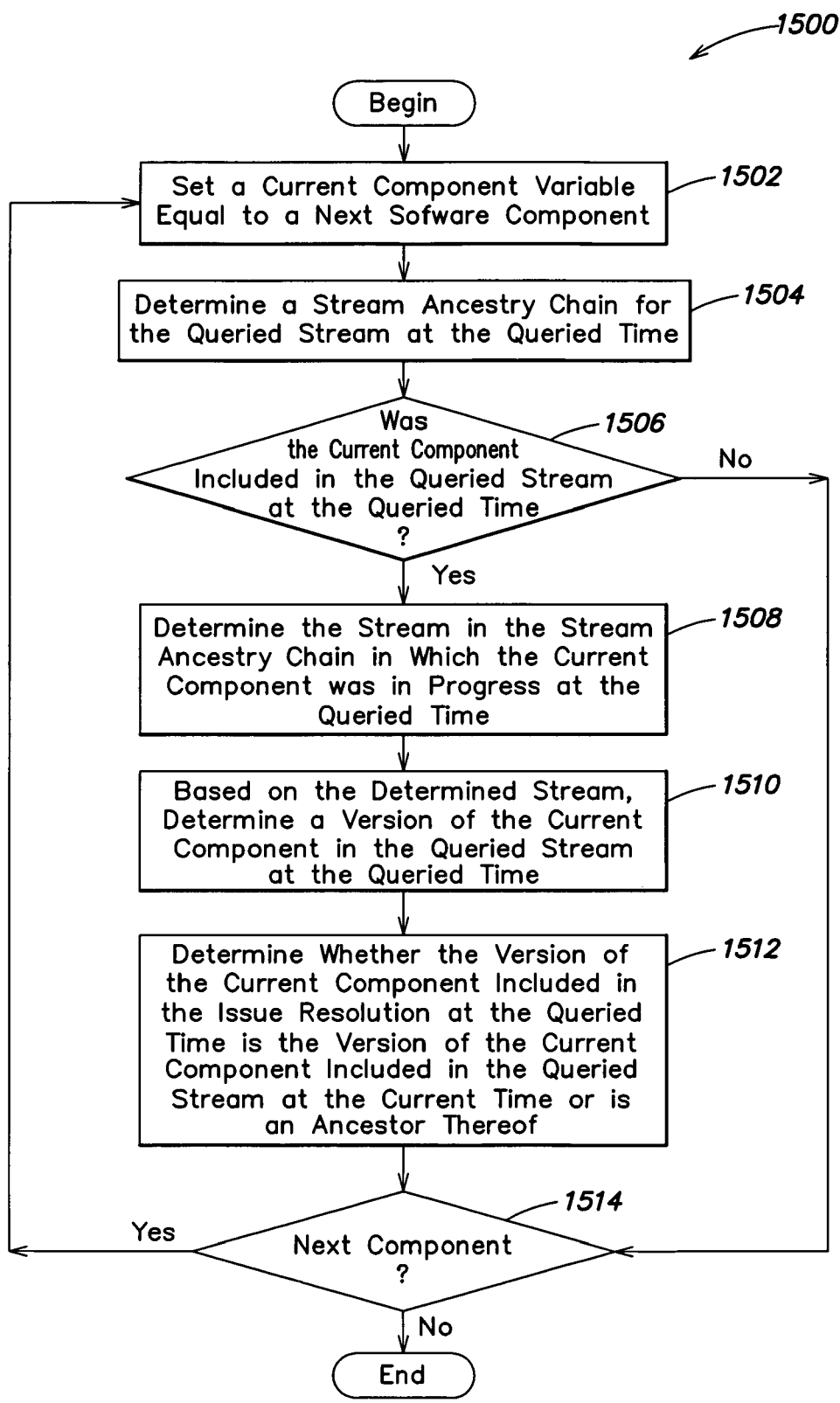
FIG. 15 is a flowchart illustrating an example of a method of determining whether software component versions are included in a queried stream at a queried time.

FIG. 15 is a flow chart illustrating an example of a method 1500 of determining whether software component versions are included in a queried stream at a queried time. Method 1500 is merely an illustrative embodiment of a method of determining whether software component versions are included in a queried stream at a queried time, and is not intended to limit the scope of the invention. Any of numerous other implementations of such a method, for example, variations of method 1500, are possible and are intended to fall within the scope of the invention.

Method 1500 may be performed as part of Act 1306, to determine whether each software component determined in Act 1304 was included in the queried stream at the queried time. Thus, method 1500 may include a plurality of computational loops, each loop corresponding to one of the software components determined in Act 1304.

In Act 1502, the current component variable may be set equal to a next software component, for example, a next software component of the components determined in Act 1304. During a first loop, the current component variable may be set equal to a first software component version of those determined in Act 1304 (e.g., a software component having a highest or lowest EID). For example, if Act 1304 (which may include performance of method 1400) were performed on data structure 806, only a single software component, file 206 (EID=2) may be determined to be included in the issue resolution at the queried time. Thus, Act 1502 may include setting a current component equal to 3.

In Act 1504, a stream ancestry chain for the queried stream at the queried time may be determined, for example, in accordance with method 1600 described below in relation to FIG. 16.

Figure 16:
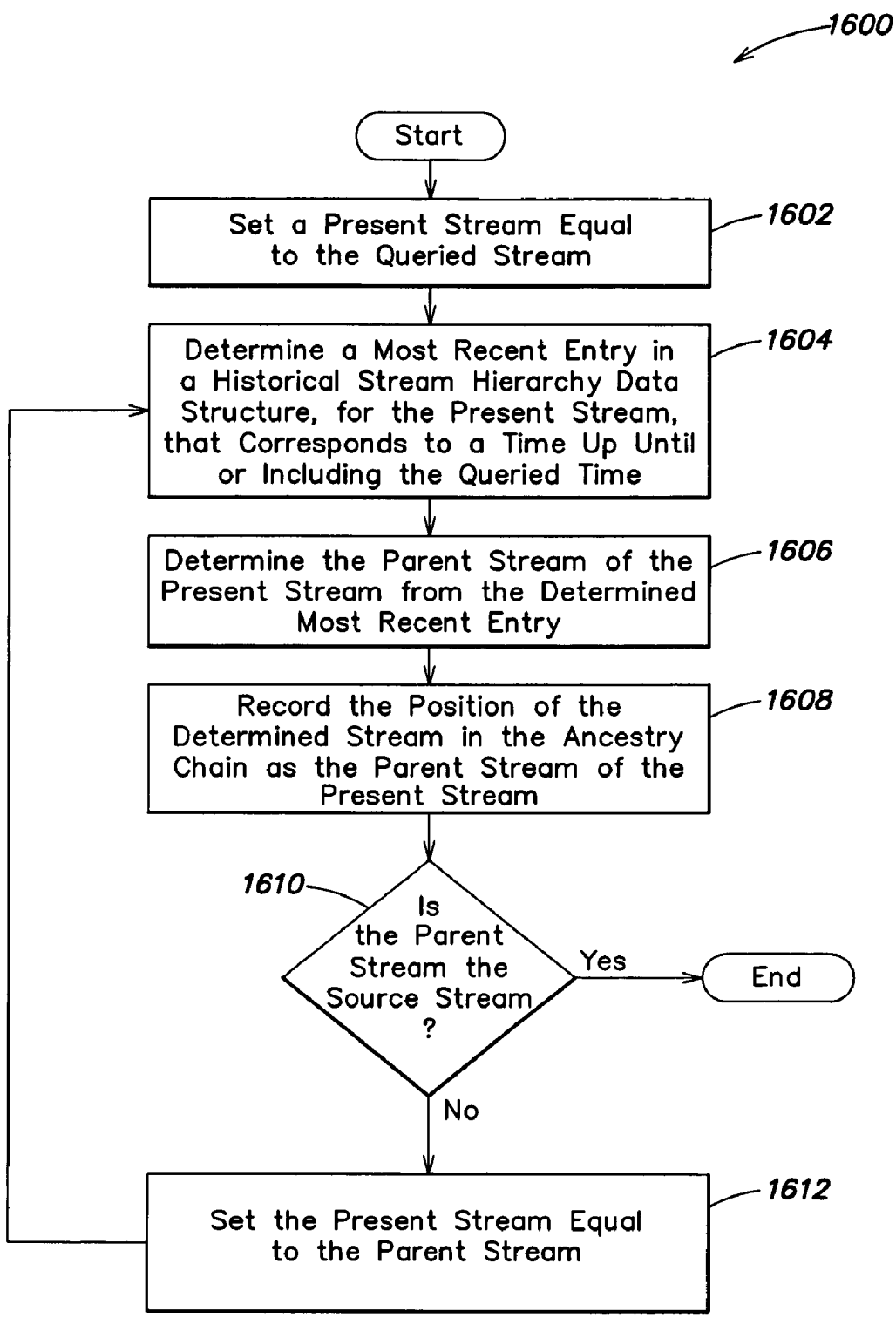
FIG. 16 is a flowchart illustrating an example of a method of determining a stream ancestry chain of a stream at a queried time.

Digressing briefly from method 1500, FIG. 16 is a flow chart illustrating an example of a method 1600 of determining a stream ancestry chain for a stream at a particular time. Method 1500 is merely an illustrative embodiment of a method of determining whether software component versions are included in a queried stream at a queried time, and is not intended to limit the scope of the invention. Any of numerous other implementations of such a method, for example, variations of method 1500, are possible and are intended to fall within the scope of the invention.

In Act 1602, a value of a present stream variable may be set equal to a value of the queried stream. For example, the present stream may be set equal to a value representing stream 318 (e.g., stream ID=5).

In Act 1604, a most recent entry in a historical stream hierarchy data structure for the present stream, that corresponds to a time up until or including the queried time, may be determined. For example, if the queried stream is stream 318 and the queried time is a time corresponding to transaction 22 or later, then Act 1604 may select entry 1218 of historical stream hierarchy data structure 1200.

In Act 1606, the parent stream of the present stream may be determined from the most recent entry determined in Act 1604. For example, stream 304 (stream ID=3) may be determined from the parent stream ID in field 1206 of entry 1218. Act 1606 may include determining that the present stream is the source stream, for example, if the parent stream ID field holds the value "0" (e.g., if the present stream is stream 302 (stream ID=1) and the most recent entry is entry 1210).

In Act 1608, the position of the determined parent stream in the ancestry chain may be recorded. For example, a temporary data structure (e.g., stored in local memory) defined by one or more variables may hold values indicating the position. This temporary data structure may be initialized (e.g., prior to a first performance of Act 1608) by recording information regarding the queried stream being the lowest link in the ancestry chain (e.g., the stream lowest in the stream hierarchy).

If it was determined in Act 1606 that the parent stream is/was the source stream, then Act 1610 may control method 1600 to end. In other words, if the parent stream is the source stream, there are no further ancestors in the stream ancestor chain.

If the parent stream is not the source stream, then in Act 1612, the present stream may be set equal to the parent stream. For example, the variable holding a value representing the present stream may be set equal to stream 304 (e.g., may be set equal to 3, the stream ID of stream 206). The method then may return to Act 1604 and repeat steps 1604-1610 for the new present stream. For example, in Act 1604, the method may determine entry 1214, which is the most recent entry in data structure 1200 for stream 304 that corresponds to a time (i.e., the time corresponding to transaction 3) up until or including the queried time (i.e., a time corresponding to transaction 54 or later). In Act 1606, the parent stream of stream 206 may be determined to be stream 302 (stream ID=1). In Act 1608, the position of the parent stream in the ancestry chain may be recorded, and in Act 1610, it may be determined that stream 302 is the source stream, such that the method ends.

The result of the performance of method 1600 is a stream ancestry chain which may be used for the remainder of the performance of methods 1200 and 1500. For example, the results may be a stream ancestry chain reflecting that, at the queried time, stream 308 is a child of stream 304, which is a child of source stream 302.

Method 1600 may include additional acts. Further, the order of the acts performed as part of method 1600 is not limited to the order illustrated in FIG. 16, as the acts may be performed in other orders and/or one or more of the acts may be performed in parallel (at least partially).

Returning to method 1500 illustrated in FIG. 15, it may be determined in Act 1506 whether the current component was included in the queried stream at the queried time. Thus, as a preliminary act (i.e., before determining the version of the current component included in the queried stream at the queried time), it may be determined whether any version of the current component is included in the queried stream at the queried time. Act 1506 may be performed as described in the Poole application, for example, in accordance with method 1300 discussed in relation to FIGS. 13 and 19 of the Poole application. Act 1506 may involve accessing historical data structures that represent changes made to streams over time, including changes made to the set of software components included in streams. For example, Act 1506 may involve accessing an historical element location data structure, such as data structure 1100 described in relation to FIG. 11 of the Poole application.

As an alternative to determining whether the current component was included in the queried stream at the queried time, Act 1506 may include determining whether the current component was included in a particular view of the queried stream at the queried time. As described in the Poole application, a "view" can be considered a developer's window into a software project, and may be specific to a stream (e.g., a workspace). The software components included within a view at a particular time may be defined using I/E rules, for example, as described in the Poole application. Determining whether a software component was included within a view of a stream at a particular time may be performed as described in the Poole application, for example, in accordance with method 1300 discussed in relation to FIGS. 13-19 thereof. This determination may involve accessing a historical Include/Exclude data structure, for example, data structure 900 described in relation to FIG. 9 of the Poole application.

Thus, method 1500 may include accessing data structures reflecting a history of changes to the sets of software components included in streams or views of streams, for example, prior to accessing data structures (e.g., data structures 1000 and 1100) reflecting a history of changes to software component versions included in streams.

If it is determined in Act 1506 that the current element was not included in the queried stream at the queried time, then method 1500 may end. In other words, if the current component was not even included in the queried stream at the queried time, then there is no need to check if any version of the current component included in the queried stream at the queried time.

If the current component was included in the queried stream at the queried time, then, in Act 1508, the stream (of the streams in the stream ancestry chain) in which the current component was in progress at the queried time may be determined. Act 1508 may include performance of method 1700, described below.

In Act 1510, a version of the current component in the queried stream at the queried time may be determined based on the stream determined in Act 1508, for example, in accordance with method 1800 described below in relation to FIG. 18.

In Act 1512, it may be determined whether the version of the current component included in the issue resolution at the queried time is the same version of the current component included in the queried stream at the queried time, or is an ancestor thereof. It should be appreciated that a descendent version of an ancestor version includes (e.g., comprises or incorporates) the ancestor version itself, even if there are intervening versions. For example, referring to FIG. 5, version 5/3 (graph element 418) includes each of its ancestor versions 4/3, 4/2 and 4/1 (graph elements 414, 412, and 404, respectively). Thus, as used herein, a stream "includes a software component version" if it includes the software component version itself or if it includes a descendant of the software component version. Act 1512 may be performed in accordance with method 1900 described below in relation to FIG. 19.

In Act 1514, it may be determined whether there is a next component, for example, another component determined in Act 1304 to be included in the queried issue resolution at the queried time. If not, method 1500 ends. Otherwise, method 1514 may return to Act 1502 in which a current component variable is set equal to the next software component, and the computational loop comprising Acts 1502-1514 may be repeated.

Method 1500 may include additional acts. Further, the order of the acts performed is part of method 1500 is not limited to the order illustrated in FIG. 15, as the acts may be performed in other orders and/or one or more of the acts may be performed in parallel (at least partially).

Figure 17:
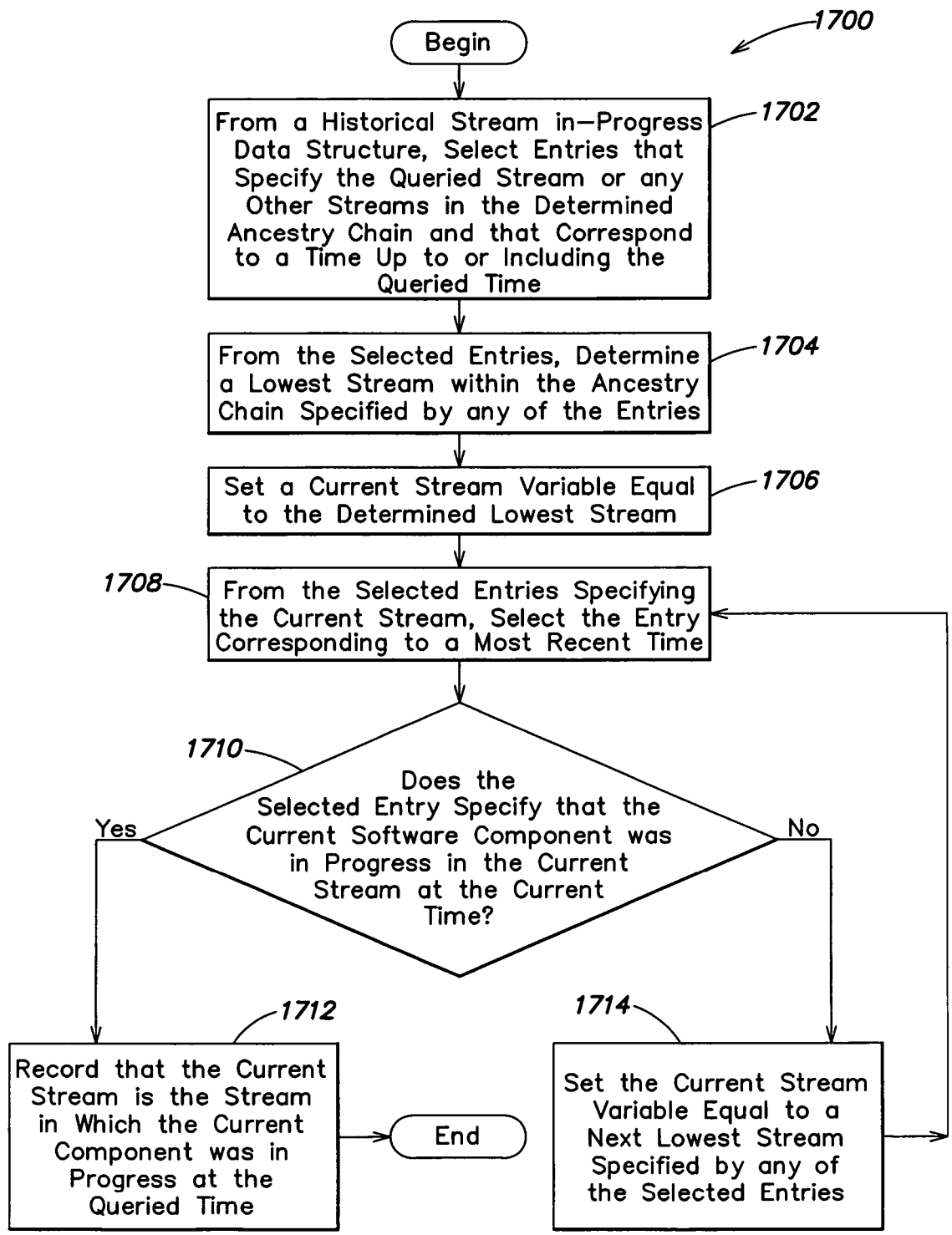
FIG. 17 is a flowchart illustrating an example of a method of determining a stream of a stream ancestry chain in which a component was in progress at a particular time.

FIG. 17 is a flowchart illustrating an example of a method 1700 of determining a stream of a stream ancestry chain in which a component was in progress at a particular time, for example, as part of performing Act 1508 described above. Method 1700 is merely an illustrative embodiment of a method of determining a stream of a stream ancestry chain in which a component was in progress at a particular time, and is not intended to limit the scope of the invention. Any of numerous other implementations of such a method, for example, variations of method 1500, are possible and are intended to fall within the scope of the invention.

In Act 1702, entries may be selected from a historical stream in-progress data structure, for example, data structure 900 described above in relation to FIG. 9. In particular, entries may be selected that specify the queried stream or any other streams in the determined ancestry chain (e.g., determined in Act 1504) and that correspond to a time up to or including the queried time. For example, if the queried stream is workspace 308 (stream ID=5) and the queried time is a time equal to or greater than the time corresponding to transaction 22, then Act 1702 may result in the selection of entries 918, 920, 926 and 928. These entries may be selected because each entry has a transaction number less than or equal to 22, and each entry specifies either stream 302 (EID=1) or stream 308 (EID=5), each of which was in the stream ancestry chain for stream 308 at the time of transaction 22 or later.

In Act 1704, from the entries selected in Act 1702, a lowest stream within the ancestry chain specified by any of the entries may be determined. For example, from entries 918, 920, 926 and 928, the lowest stream in the ancestry chain is stream 308 (EID=5).

In a following Act 1706, a current stream variable may be set equal to the lowest stream determined in Act 1704. For example, the current stream variable may be set equal to the stream ID of the lowest determined stream, e.g., "5." In Act 1708, from the entries selected in Act 1702 that specify the current stream, the entry corresponding to a most recent time may be selected. For example, entries 920, 926 and 928 specify stream 308. From these entries, entry 928 corresponds to a most recent time, e.g., the time corresponding to transaction 13. Thus, entry 928 may be selected in Act 1708.

In Act 1710, it may be determined whether the selected entry specifies that the current software component was in progress in the current stream at the current time. Act 1710 may include accessing field 908 in data structure 900 for the selected entry. For example, Act 1710 may include accessing field 908 of entry 928 and determining that the current software component was in progress in the current stream at the current time because field 908 holds a value of "1." Alternatively, if the selected entry was entry 916, then Act 1710 may determine that the current stream was not in progress at the current time because the value of field 908 is "0."

If it is determined in Act 1710 that the current software component was not in progress in the current stream at the current time, then, in Act 714, the current stream variable may be set equal to a next lowest stream specified by any of the selected entries, and method 1700 may return to Act 1708. Acts 1708 and 1710 then may be repeated for the next lowest stream. For example, if the selected entry was entry 916, then Act 1710 may have proceeded to Act 714, which may have set the current stream variable equal to stream 302 (EID=1).

Acts 1708, 17010 and 1714 may be repeated until the stream in which the current component was in progress at the queried time is determined.

If it is determined in Act 1710 that the current software component was in progress in the current stream at the current time, then, in Act 1712, it may be recorded that the current stream is the stream in which the current component was in progress at the queried time. This recorded information then may be used in Act 1510, for example, during the performance of method 1800.

Method 1700 may include additional acts. Further, the order of the acts performed as part of method 1700 is not limited to the order illustrated in FIG. 17, as the acts may be performed in other orders and/or one or more of the acts may be performed in parallel (at least partially).

Figure 18:
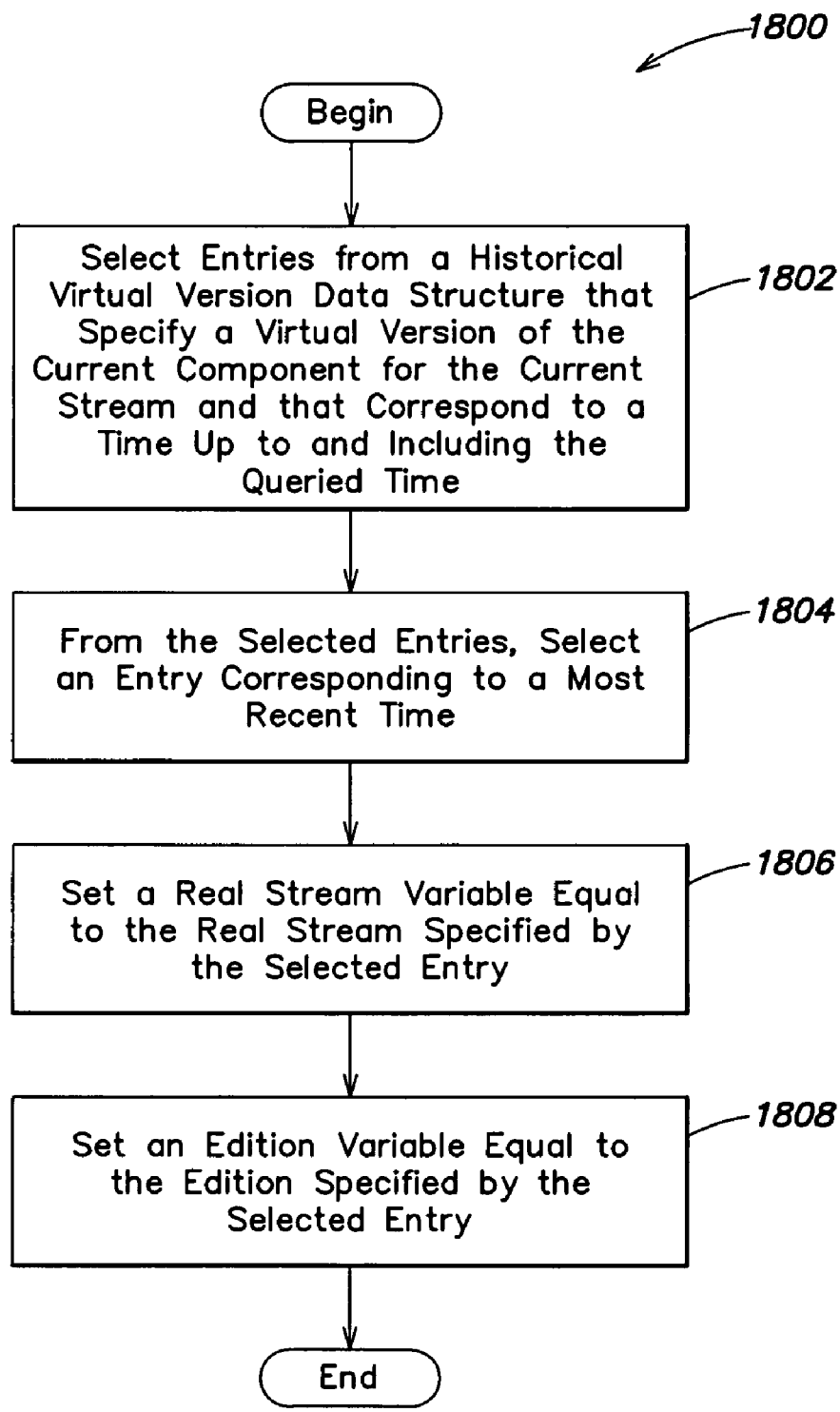
FIG. 18 is a flowchart illustrating an example of a method of determining a version of a software component included in a stream at a particular time.

FIG. 18 is a flow chart illustrating an example of a method 1800 of determining a version of a software component included in a stream at a particular time. Method 1800 is merely an illustrative embodiment of a method of determining a version of a software component included in a stream at a particular time, and is not intended to limit the scope of the invention. Any of numerous other implementations of such a method, for example, variations of method 1800, are possible and are intended to fall within the scope of the invention. Method 1800 may be performed as part of Act 1510 of method 1500 described above.

In Act 1802, entries may be selected from a historical virtual version data structure, for example, data structure 1000 described above in relation to FIG. 10. More specifically, Act 1802 may include selecting entries that specify a virtual version of the current component for the current stream, and that correspond to a time up to and including the queried time. For example, Act 1802 may include selecting entries from data structure 1000 having: an EID field 1002 specifying the current component, a stream ID field 1004 specifying the current stream and a transaction number field 1012 specifying a value corresponding to a time no later than the queried time. If the current component is file 206 (EID=2), the current stream is workspace 308 (stream ID=5) and the time corresponds to a time no later than the time corresponding to transaction 22, then Act 1802 may include selecting entries 1020, 1026, and 1028 from data structure 1000.

In Act 1804, an entry corresponding to a most recent time may be selected from the entries selected in Act 1802. For example, from entries 1020, 1026, and 1028, entry 1028 may be selected because entry 1028 specifies transaction 13, which is higher than transactions 10 and 12 specified by entries 1020 and 1026, respectively, and thus corresponds to a most recent time.

In Act 1806, a real stream variable may be set equal to the real stream specified by the selected entry. For example, if the selected entry is entry 1028, then Act 1806 may include setting a real stream variable equal to "5," which is the stream ID for stream 308. In Act 1808, an edition variable may be set equal to the edition specified by the selected entry. For example, if the selected entry is entry 1028, then Act 1808 may include setting an edition variable equal to "3," which is the edition specified by field 1010 of entry 1028.

As described above, a version (i.e., a real version) of a software component may be defined by a stream/edition pair. Thus, Acts 1806 and 1808 record (at least temporarily) the stream/edition pair (i.e., the real version) specified by fields 1008 and 1010 that corresponds to the virtual version specified by the combination of fields 1004 and 1006. This determined real version of the software component may be used as part of Act 1512, for example, as part of performing method 1900, which will now be described.

Method 1800 may include additional acts. Further, the order of the acts performed as part of method 1800 is not limited to the order illustrated in FIG. 18, as the acts may be performed in other orders and/or one or more of the acts may be performed in series or in parallel (at least partially).

Figure 19:
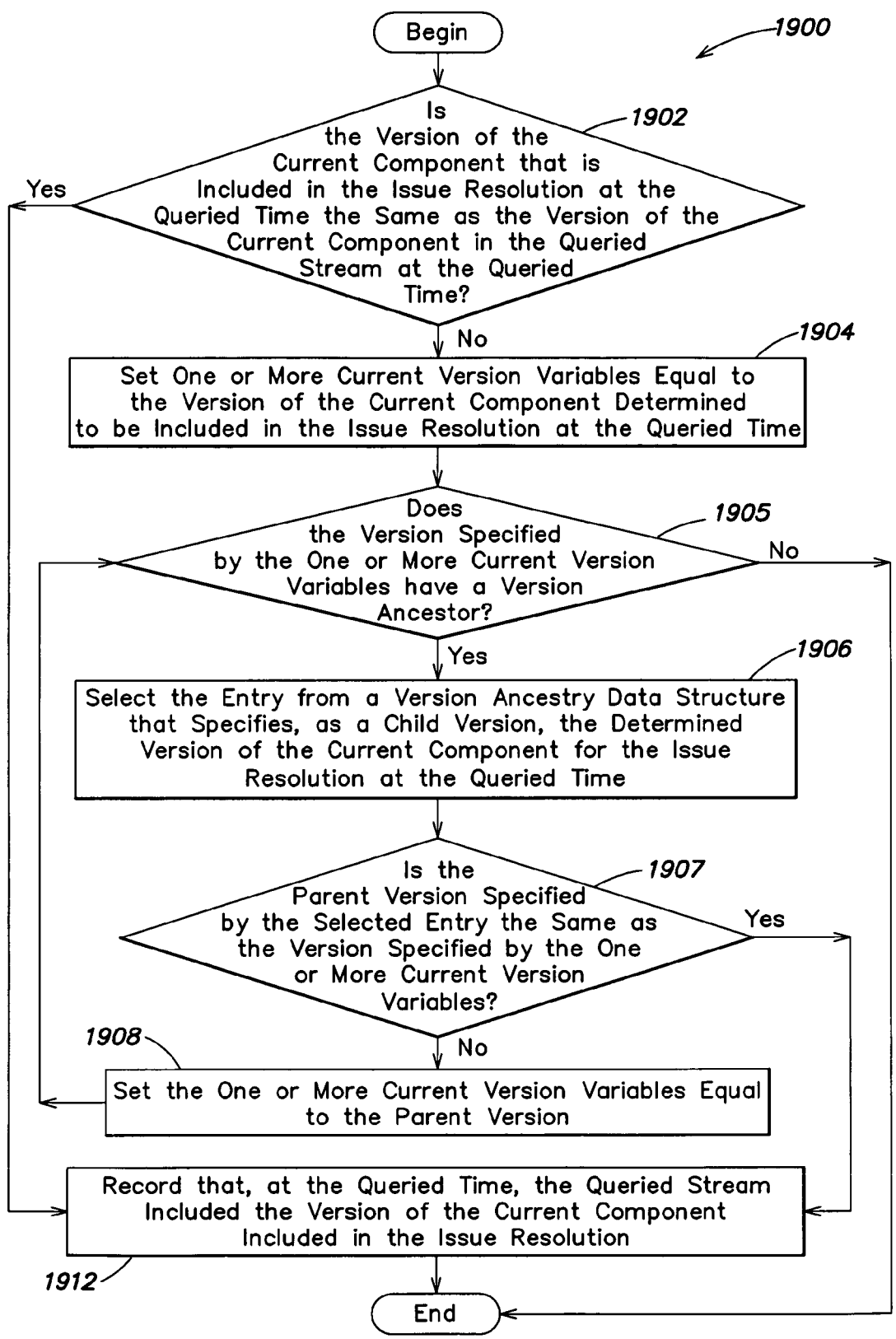
FIG. 19 is a flowchart illustrating an example of a method of determining whether a version of a software component that is included in an issue resolution at a particular time was comprised in the version of the software component included in a stream at the particular time.

FIG. 19 is a flow chart illustrating an example of a method 1900 of determining whether a version of a software component that is included in an issue resolution at a particular time is the same as the version of the software component included in a stream at a particular time, or is an ancestor thereof. Method 1800 may include additional acts. Further, the order of the acts performed as part of method 1800 is not limited to the order illustrated in FIG. 18, as the acts may be performed in other orders and one or more of the acts may be performed in series or in parallel (at least partially).

Act 1902 may include determining whether the version of the current component that is included in the issue resolution at the current time (e.g., as determined in Act 1304) is the same as the version of the current component included in the queried stream at the queried time. Act 1902 may include determining whether the stream/edition pair of the current component determined in Act 1304 of method 1300 is the same as the stream/edition pair determined in Act 1510 of method 1500 (which may have been recorded in Acts 1806 and 1808 of method 1800).

If the versions are the same, then, at the queried time, the queried stream included the same version of the current component included in the issue resolution. This information may be recorded in Act 912, and may be reported as part of Act 1308.

For example, if the current software component is file 206 (EID=2), the queried stream is workspace 308 (stream ID=5) and the queried time corresponds to a time no later than the time corresponding to transaction 22, then Acts 1304 and 1510 both may determine real version 5/3 (i.e., the third edition of file 206 in workspace 308). This information may be recorded in Act 1912.

As another example, if the current software component is file 206, the queried stream is workspace 308, but the queried time corresponds to a time no later than the time corresponding to transaction 20 (e.g., the time specified by entry 810 is data structure 800), Act 1304 may determine real version 5/1 (i.e., the first edition of file 206 in workspace 308) and Act 1510 determines real version of 5/3. In this situation, method 1900 may proceed to Act 1904, described below.

Thus, in Act 1902 it may be determined whether there is an exact match between the version of the current component included in the issue resolution at the current time and the version of the current component included in the queried stream at the queried time. If there is not an exact match, then method 1900 may include determining whether the version of the current component included in the issue resolution at the queried time is an ancestor of the version included in the queried stream at the queried time. This determination may be made by performance of Acts 1904-1908, which will now be described.

If in Act 1902 it is determined that the versions are not the same, then, in Act 1904, one or more current version variables may be set equal to the version of the current component determined to be included in the issue resolution at the queried time. For example, one or more current version variables may be set equal to the stream/edition pair determined for the current component in Act 1304 (e.g., 5/1 in the preceding example).

The entry from an ancestry data structure that specifies, as a child version, the determined version of the current component for the issue resolution may be selected in Act 1906. For example, the entry in ancestry data structure 1100 that specifies the current component in field 1102, and specifies the determined stream/edition pair of the current component for the issue resolution in fields 1108 and 110, respectively, may be selected. For example, continuing the example in which the software component is filed 206, the stream is workspace 308 and the time corresponds to a time no later than the time corresponding to transaction 20, act 1906 may include selecting entry 1112.

In Act 1905, it may be determined whether there is an entry in the ancestry structure that specifies, as a child version, the version of the current component specified by the one or more current version variables. For example, Act 1905 may include determining whether the combination of fields 1108 and 1110 of any entry in data structure 1100 specify the version of the software component determined in Act 1304. There may be no such entry in the ancestry data structure if the software component version represented by the one or more variables was not derived from any other software component version. Such a situation may exist if a software component version results from the creation of a new software component in a workspace. In such a situation, the software component version would not have any ancestor version.

If it is determined that the determined software component version for the issue resolution does not have any ancestor version, then method 1900 may end. In such a case, method 1900 results in the determination that the version of the current component included in the issue resolution at the queried time was not included in the queried stream at the queried time. Otherwise, method 1900 may proceed to Act 1906.

In Act 1906, the entry from a version ancestry data structure (e.g., data structure 1100) that specifies, as a child version, the version specified by the one or more current version variables may be selected. For example, if the current software component is file 206, the queried stream is workspace 308 and the queried time corresponds to a time no later than the time corresponding to transaction 22, then Act 1906 may include selecting entry 1112.

In Act 1907, it may be determined whether the parent version of the current component specified by the selected entry is the same version as the version of the current component specified by the one or more current version variables. Act 1907 may include comparing the version specified by the one or more current version variables to the version specified by the combination of fields 1104 and 1106 of the entry selected in Act 1906.

If it is determined in Act 1907 that the parent version and the version specified by the one or more variables are the same, then, at the queried time, the version of the current component included in the queried stream is same version of the current component included in the issue resolution. Accordingly, method 1900 may proceed to Act 1912. Otherwise, method 1900 may proceed to Act 1908.

For example, if the current software component is file 206, the queried stream is workspace 308 and the queried time corresponds to a time no later than the time corresponding to transaction 22, then the parent version may be determined to be version 4/1 from fields 1104 and 1106 of entry 1112. This real version is not the same as version 5/3 included in the issue resolution at the query time (e.g., as determined in Act 1304). Accordingly, method 1900 may proceed to Act 1908.

In Act 1908, the one or more current version variables (described above in relation to Act 1904) may be set equal to the parent version determined in Act 1907. For example, Act 1908 may include setting the one or more current version variables equal to version 4/1 specified by fields 1104 and 1106 of entry 1112. Method 1900 then may proceed to Act 1905, and Acts 1905-1907 may be repeated.

Thus, Acts 1905-1908 may navigate through the version ancestry data structure, for the version of the current component determined to be included in the issue resolution at the queried time, until an ancestor version is found or it is determined that there is no ancestor version.

Method 1900 may include additional acts. Further, the order of the acts performed as part of method 1900 is not limited to the order illustrated in FIG. 19, as the acts may be performed in other orders and/or one or more of the acts may be performed in parallel (at least partially).

Methods 600 and 1300-1900, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of any of systems 100, 2000 and 2100 described herein, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

It should be appreciated that any single component or collection of multiple components of a computer system, for example, the computer system described below in relation to FIGS. 21 and 22, that perform the functions described above with respect to describe or reference the method can be generically considered as one or more controllers that control the above-discussed functions. The one or more controllers can be implemented in numerous ways, such as with dedicated hardware, or using a processor that is programmed using microcode or software to perform the functions recited above.

FIG. 20 is a block diagram illustrating an example of a system 2000 for modifying an issue resolution (e.g., adding, changing or removing software component versions), and for determining which software component versions of an issue resolution are included in a stream at a particular time. Method 1900 may include additional acts. Further, the order of the acts performed as part of method 1900 is not limited to the order illustrated in FIG. 19, as the acts may be performed in other orders and one or more of the acts may be performed in series or in parallel (at least partially).

System 2000 is an example of system 100 described above in relation of FIG. 1. System 2000 may include issue tracking engine 102 and historical development project database 106. Issue tracking engine 102 may include any of user interface 104, issue resolution engine 2026, transaction number generator 2028, issue resolution components generator 2030 and stream components version checker 2034.

User interface 104 may be configured to receive an issue value 2006 and one or more software component version values 2008 (e.g., provided by a user) and pass these values (or alternative representations of these values) to issue resolution engine 2026. Issue resolution engine 2026 may be configured to perform method 600 described above in relation to FIG. 6. Issue resolution engine 206 may be configured to receive values 2010 and 2012 and generate one or more historical issue resolution entries 2035. This generation may involve interacting with transaction number generator 2028 to determine a transaction number for the one or more entries 2035. Generator 2028 may be configured to determine a next available transaction number to assign to the one or more entries, for example, by accessing transaction data structure 2040. Engine 2026 may be configured to store the one or more historical issue resolution entries 2035 (e.g., and of entries 812-818) in historical issue resolution data structure 2036 (e.g., data structure 812 described above in relation to FIG. 8).

User interface also may be configured, in response to receiving an issue value 2006 and a time/transaction value 2010 (e.g., a time or a transaction number), to pass these values to issue resolution components generator 2030. Generator 2030 may be configured to determine the one or more software component versions included in an issue resolution at a particular time (e.g., in accordance with method 1400), and to output the one or more software component versions 2032 to stream components version checker 2034. Generator 2030 may be configured to make such a determination by accessing historical issue resolution data structure 2036, based on the issue value 2026 and the time/transaction value 2022 received from the user interface 104. In some embodiments, no time/transaction value 2022 is specified by the user. In such cases, a default time/transaction value of the current time may be used. If value 2022 specifies a time or if a default time is used, generator 2030 may interact with transaction number generator 2028 to determine a transaction number corresponding to the time. Transaction number generator 2028 may determine a transaction number by accessing a transaction data structure 2040 to map the specified time to a transaction number, as described above. Historical issue resolution data structure 2036 may be configured similar to or the same as data structure 800 described above in relation to FIG. 8.

User interface 102 may be configured to receive a stream value 2012, and to pass the stream value (or another representation of the stream value) along with a time/transaction value 2010 (or another representation thereof), to stream components version checker 2034. Time/transaction value 2010 alternatively may be received from issue resolution components generator 2030 if generator 2030 already determined or received a transaction number. Further, stream components version checker 2034 may determine a transaction number itself by interacting with transaction number generator 2028.

Stream components version checker may be configured to determine whether software component versions 2032 determined by generator 2030 are included in the stream specified by stream value 2012 (e.g., the queried stream) at a queried time (e.g., the time specified or corresponding to value 2010). Version checker 2034 may be configured to make this determination by accessing any of historical stream hierarchy data structure 2038 (e.g., data structure 1200 described above in relation to FIG. 12), historical element location data structure 2042 (e.g., in the Poole application, data structure 1100 described in relation to FIG. 11), historical Include/Exclude rules data structure 2044 (e.g., in the Poole application, data structure 900 described in relation to FIG. 9), historical stream in-progress data structure 2046 (e.g., data structure 900 described above in relation to FIG. 9), historical virtual version mapping data structure 2048 (e.g., data structure 1000 described above in relation to FIG. 10) and version ancestry data structure 2050 (e.g., data structure 1100 described above in relation to FIG. 11). Version checker 2034 may access any of these data structures based on any of inputs 2032, 2010 or 2012.

Version checker 2034 may be configured to perform method 1500 described above in relation to FIG. 15, and may output one or more software component versions 2037. Software component versions 2037 may represent the software component versions included in an issue resolution (e.g., specified by issue value 2006) at a queried time (e.g., specified or corresponding to value 2010) that were also included in a queried stream (e.g., specified by value 2012) at the queried time. Version checker 2034 may include any of the system components described in the Poole application in relation to system 2000 (FIG. 20), for example, stream view engine 2002 and any components thereof.

Issue resolution components generator 2030 and stream components version checker 2034 may be configured to interact with one another to perform method 1300 described above in relation to FIG. 13.

Any of components of system 2000, including stream view engine 2000 and components 102, 104, 2026, 2028, 2030 and 2034 thereof, may be configured (e.g., programmed) using any of a variety of techniques. In some embodiments, one or more parameters or functionality of a component may be configured to exhibit permanent behavior by a programmer. For example, the system may be configured such that, after it is installed at a customer site, it cannot be altered by a programmer by altering program code or by any other means.

In some embodiments, one or more parameters or functionality of a component may be dynamically programmable by a programmer after the system has been installed. For example, the component may provide one or more programming "hooks" that enable a programmer to program functionality of the component by manipulating program code (e.g., through one or more APIs) and/or that enable a user to program functionality using high-level scripts.

In some embodiments, one or more parameters or functionality of a component may be dynamically programmable by a user without resort to program code or scripts after the system has been installed. For example, a user interface such as any of those described herein may enable a user to program functionality, for example, by providing values for certain parameters. For example, a user may be enabled to program the user interface 104 to control GUI display 700 to display or not display certain information.

Any of the components of system 2000 may be configured (using any combination of the above techniques) to exhibit default behavior. For example, the issue resolution components generator 2030 and the stream components version checker may be configured to use a current time as the queried time by default. It should be appreciated that any of the components of system 2000 may be configured with any suitable functionality described herein, including default functionality.

System 2000, and components thereof may be implemented using software (e.g., C, C#, C++, Java, or a combination thereof), hardware (e.g., one or more application-specific integrated circuits), firmware (e.g., electrically-programmed memory) or any combination thereof. One or more of the components of system 2000 may reside on a single device (e.g., a computer), or one or more components may reside on separate, discrete devices. Further, each component may be distributed across multiple devices, and one or more of the devices may be interconnected.

Further, on each of the one or more devices that include one or more components of system 2000, each of the components may reside in one or more locations on the system. For example, different portions of the components of system 2000 may reside in different areas of memory (e.g., RAM, ROM, disk, etc.) on the device. Each of such one or more devices may include, among other components, a plurality of known components such as one or more processors, a memory system, a disk storage system, one or more network interfaces, and one or more busses or other internal communication links interconnecting the various components.

Various embodiments according to the invention may be implemented on one or more computer systems. These computer systems, may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to modify an issue resolution and/or to determine which software component versions of an issue resolution are included in a version of a software development project at a particular time, according to any of the embodiments described above.

A general-purpose computer system, according to some embodiments of the invention, is configured to perform one or more of the methods described above and/or portions thereof. It should be appreciated that the system may perform other functions, and the invention is not limited to having any particular function or set of functions.

For example, various aspects of the invention may be implemented as specialized software executing in a general-purpose computer system 2100 such as that shown in FIG. 21. The computer system 2100 may include a processor 2103 connected to one or more memory devices 2104, such as a disk drive, memory, or other device for storing data. Memory 2104 is typically used for storing programs and data during operation of the computer system 2100. Components of computer system 2100 may be coupled by an interconnection mechanism 2105, which may include one or more busses (e.g., between components that are integrated within a same machine) and/or a network (e.g., between components that reside on separate discrete machines). The interconnection mechanism 2105 enables communications (e.g., data, instructions) to be exchanged between system components of system 2100. Computer system 2100 also includes one or more input devices 2102, for example, a keyboard, mouse, trackball, microphone, touch screen, and one or more output devices 2101, for example, a printing device, display screen, speaker. In addition, computer system 2100 may contain one or more interfaces (not shown) that connect computer system 2100 to a communication network (in addition or as an alternative to the interconnection mechanism 2105.

The storage system 2106, shown in greater detail in FIG. 22, typically includes a computer readable and writeable nonvolatile recording medium 2201 in which signals are stored that define a program to be executed by the processor or information stored on or in the medium 2201 to be processed by the program. The medium may, for example, be a disk or flash memory. Typically, in operation, the processor causes data to be read from the nonvolatile recording medium 2201 into another memory 2202 that allows for faster access to the information by the processor than does the medium 2201. This memory 2202 is typically a volatile, random access memory such as a dynamic random access memory (DRAM) or static memory (SRAM). It may be located in storage system 2106, as shown, or in memory system 2104, not shown. The processor 2103 generally manipulates the data within the integrated circuit memory 2104, 2202 and then copies the data to the medium 2201 after processing is completed. A variety of mechanisms are known for managing data movement between the medium 2201 and the integrated circuit memory element 2104, 2202, and the invention is not limited thereto. The invention is not limited to a particular memory system 2104 or storage system 2106.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 2100 is shown by way of example as one type of computer system upon which various aspects of the invention may be practiced, it should be appreciated that aspects of the invention are not limited to being implemented on the computer system as shown in FIG. 21. Various aspects of the invention may be practiced on one or more computers having a different architecture or components that that shown in FIG. 21.

Computer system 2100 may be a general-purpose computer system that is programmable using a high-level computer programming language. Computer system 2100 may be also implemented using specially programmed, special purpose hardware. In computer system 2100, processor 2103 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP operating systems available from the Microsoft Corporation, MAC OS System X available from Apple Computer, the Solaris Operating System available from Sun Microsystems, or UNIX or LINUX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any equivalent means, known now or later developed, for performing the recited function.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. For a software development project represented by a hierarchy of versions of the software development project, each version comprising a set of versions of software components, a method of determining whether one or more software component versions included in an issue resolution at a first time are included in a first version of the software development project at the first time, the issue resolution representing a change to the software development project, the method comprising acts of:
   (A) determining the one or more software component versions included in the issue resolution for the software development project at the first time by accessing a data structure representing a history of changes to the issue resolution, the issue resolution comprising at least one software component which comprises functional software code for a software product; and
   (B) for each software component version determined in act (A), determining whether the software component version was included in the first version of the software development project at the first time.

2. The method of claim 1, wherein the act (B) comprises accessing a data structure representing a history of changes to at least the first version of the software development project.

3. The method of claim 1, wherein the first time is a past time.

4. The method of claim 1, wherein the software component is a file.

5. The method of claim 1, wherein act (A) comprises accessing a plurality of entries in the data structure, each entry including one or more values indicating a version of a software component, one or more values corresponding to a particular time and one or more values indicating whether the version of the software component was included in the issue resolution at the particular time.

6. For a software development project represented by a hierarchy of versions of the software project, each version comprising a set of versions of software components, a system including a processor configured for determining whether one or more software component versions included in an issue resolution at a first time are included in a first version of the software development project at the first time, the issue resolution representing a change to the software development project, the system comprising:
   an issue resolution components generator to receive one or more inputs specifying an issue resolution for the software development project and a value corresponding to the first time, to determine the one or more software components versions included in the issue resolution at the first time by accessing a data structure representing a history of changes to the issue resolution, the issue resolution comprising at least one software component which comprises functional software code for a software product, and to output the one determined software component versions; and
   a version checking module to receive one or more inputs specifying the one or more determined software component versions and a value corresponding to the first time, to determine, for each of the one or more determined software, component versions, whether the determined version was included in the first version of the software development project at the first time.

7. The system of claim 6, wherein the version checking module is operative to access a data structure representing a history of changes to the first version to determine, for each of the one or more determined software component versions, whether the determined version was included in the first project version at the first time.

8. The system of claim 7, further comprising:
   the data structure representing the history of changes to at least the first version of the software development project.

9. The system of claim 6, wherein the first time is a past time.

10. The system of claim 6, wherein the software component is a file.

11. The system of claim 6, wherein, to determine the one or more software components versions included in the issue resolution at the first time, the issue resolution components generator is operative to access a plurality of entries in the data structure, each entry including one or more values indicating a version of a software component, a one or more values corresponding to a particular time and one or more values indicating whether the version of the software component was included in the issue resolution at the particular time.

12. The system of claim 6, further comprising:
   the data structure representing the history of changes to the issue resolution.

13. For a software development project represented by a hierarchy of versions of the software project, each version comprising a set of versions of software components, a system including a processor configured for determining whether one or more software component versions included in an issue resolution at a first time are included in a first version of the software development project at the first time, the issue resolution representing a change to the software development project, the system comprising:

means for determining the one or more software component versions included in the issue resolution of the software development project at the first time by accessing a data structure representing a history of changes to the issue resolution, the issue resolution comprising at least one software component which comprises functional software code for a software product; and a version checking module to receive one or more inputs specifying the one or more determined software component versions and a value corresponding to the first time, to determine, for each of the one or more determined software component versions, whether the determined version was included in the first version of the software development project at the first time.

14. For a software development project represented by a hierarchy of versions of the software development project, each version comprising a set of versions of software components, a computer-readable medium having computer-readable signals stored thereon that define instructions that, as a result of being executed by a computer, control the computer to perform a method of determining whether one or more software component versions included in an issue resolution at a first time are included in a first version of the software development project at the first time, the issue resolution representing a change to the software development project, the method comprising acts of:

(A) determining the one or more software component versions included in the issue resolution of the software development project at the first time by accessing a data structure representing a history of changes to the issue resolution, the issue resolution comprising at least one software component which comprises functional software code for a software product; and (B) for each software component version determined in act (A), determining whether the software component version was included in the first version of the software development project at the first time.

15. A computer-readable medium having stored thereon a plurality of computer-readable signals defining a data structure for use in conjunction with a configuration management software application for managing a software development project including a plurality of software components, the data structure representing a history of changes to an issue resolution, the issue resolution including one or more software components representing a change to the software development project, wherein the data structure comprises:

a plurality of entries, each entry including one or more values corresponding to a particular time, one or more values indicating a version of a software component and one or more values indicating whether the version of the software component was included in the issue resolution of the software development project at the particular time, the issue resolution comprising at least one software component which comprises functional software code for a software product.

16. The computer-readable medium of claim 15, wherein, for one or more entries of the data structure, the one or more values corresponding to a particular time is a transaction number.

17. The computer-readable medium of claim 15, wherein, for one or more entries of the data structure, the one or more values indicating a version of a software component include a value indicating a version of the software development project and a value representing an edition of the software component for the software development project version.

18. For a software development project represented by a hierarchy of versions of the software project, each version comprising a set of versions of software components, a method of modifying the contents of an issue resolution representing a change to the software development project, the method comprising acts of:

(A) receiving, at a first time, one or more inputs specifying whether to include a first software component version in a first issue resolution of the software development project, the issue resolution comprising at least one software component which comprises functional software code for a software product; and (B) recording an entry in a data structure representing a history of changes to at least the first issue resolution, the entry including one or more values corresponding to the first time, and one or more values specifying whether to include the first software component in the first issue resolution at the first time.

19. The method of claim 18, wherein the act (B) comprises recording, for one or more entries of the data structure, a transaction number as one of the one or more values corresponding to a first time.

20. The method of claim 18, wherein, the act (B) comprises recording, for one or more entries of the data structure, a value indicating a version of the software development project and a value representing an edition of the software component for the software development project version as part of the one or more values indicating a version of a software component.

21. For a software development project represented by a hierarchy of versions of the software project, each version comprising a set of versions of software components, a system for modifying the contents of an issue resolution representing a change to the software development project, the system comprising:

a user interface to receive, at a first time, one or more inputs specifying whether to include a first software component version in a first issue resolution of the software development project, the first issue resolution comprising at least one software component which comprises functional software code for a software product; and an issue resolution engine to record an entry in a data structure representing a history of changes to at least the first issue resolution, the entry including one or more values corresponding to the first time, and one or more values specifying whether to include the first software component in the first issue resolution at the first time.

22. The system of claim 21, wherein the issue resolution engine is operative to record, for one or more entries of the data structure, a transaction number as one of the one or more values corresponding to a particular time is.

23. The system of claim 21, wherein the issue resolution engine is operative to record, for one or more entries of the data structure, a value indicating a version of the software development project and a value representing an edition of the software component for the software development project version as part of the one or more values indicating a version of a software component.

24. For a software development project represented by a hierarchy of versions of the software project, each version comprising a set of versions of software components, a system for modifying the contents of an issue resolution representing a change to the software development project, the system comprising:

a user interface to receive, at a first time, one or more inputs specifying whether to include a first software component version in a first issue resolution of the software development project, the first issue resolution comprising at least one software component which comprises functional software code for a software product; and means for recording an entry in a data structure representing a history of changes to at least the first issue resolution, the entry including one or more values corresponding to the first time, and one or more values specifying whether to include the first software component in the first issue resolution at the first time.

25. For a software development project represented by a hierarchy of versions of the software project, each version comprising a set of versions of software components, a computer-readable medium having computer-readable signals stored thereon that define instructions that, as a result of being executed by a computer, control the computer to perform a method of modifying the contents of an issue resolution representing a change to the software development project, the method comprising acts of:

(A) receiving, at a first time, one or more inputs specifying whether to include a first software component version in a first issue resolution of the software development project, the first issue resolution comprising at least one software component which comprises functional software code for a software product; and (B) recording an entry in a data structure representing a history of changes to at least the first issue resolution, the entry including one or more values corresponding to the first time, and one or more values specifying whether to include the first software component in the first issue resolution at the first time.

* * * * *